US007844717B2

(12) United States Patent
Herz et al.

(10) Patent No.: US 7,844,717 B2
(45) Date of Patent: Nov. 30, 2010

(54) USE OF PROXY SERVERS AND PSEUDONYMOUS TRANSACTIONS TO MAINTAIN INDIVIDUAL'S PRIVACY IN THE COMPETITIVE BUSINESS OF MAINTAINING PERSONAL HISTORY DATABASES

(76) Inventors: Frederick S. M. Herz, P.O. Box #67, Warrington, PA (US) 18976; Matthew Radin, 861 Larkfield Rd., Commack, NY (US) 11725; Bhupinder Madan, 175 Irving Pl., Basking Ridge, NJ (US) 07920

( * ) Notice: Subject to any disclaimer, the term of this patent is extended or adjusted under 35 U.S.C. 154(b) by 1242 days.

(21) Appl. No.: 10/623,262

(22) Filed: Jul. 18, 2003

(65) Prior Publication Data
US 2006/0031301 A1 Feb. 9, 2006

(51) Int. Cl.
G06F 15/16 (2006.01)
(52) U.S. Cl. ........................ 709/229; 709/206
(58) Field of Classification Search ............... 709/206, 709/229
See application file for complete search history.

(56) References Cited

U.S. PATENT DOCUMENTS

| | | | | | |
|---|---|---|---|---|---|
| 5,754,938 | A | * | 5/1998 | Herz et al. | 725/116 |
| 5,855,018 | A | | 12/1998 | Chor | |
| 5,864,667 | A | * | 1/1999 | Barkan | 726/10 |
| 6,148,342 | A | * | 11/2000 | Ho | 709/225 |
| 6,253,203 | B1 | * | 6/2001 | O'Flaherty et al. | 707/9 |
| 6,460,036 | B1 | * | 10/2002 | Herz | 707/10 |
| 6,526,448 | B1 | * | 2/2003 | Blewett | 709/238 |
| 6,931,419 | B1 | * | 8/2005 | Lindquist | 707/200 |
| 7,188,358 | B1 | * | 3/2007 | Hisada et al. | 726/2 |
| 7,213,258 | B1 | * | 5/2007 | Kesarwani | 726/3 |
| 2002/0124092 | A1 | * | 9/2002 | Urien | 709/229 |
| 2002/0174364 | A1 | * | 11/2002 | Nordman et al. | 713/201 |
| 2003/0097383 | A1 | * | 5/2003 | Smirnov et al. | 707/204 |
| 2003/0115457 | A1 | * | 6/2003 | Wildish et al. | 713/157 |
| 2003/0172090 | A1 | * | 9/2003 | Asunmaa et al. | 707/200 |

(Continued)

FOREIGN PATENT DOCUMENTS

DE 10327291 2/2005

(Continued)

OTHER PUBLICATIONS

U.S. Appl. No. 11/691,263 dated Mar. 26, 2007.

(Continued)

Primary Examiner—Dohm Chankong
Assistant Examiner—Brian P Whipple
(74) Attorney, Agent, or Firm—Woodcock Washburn LLP

(57) ABSTRACT

A system is provided that preserves data privacy for the Individual-I and Private Data Owner (PDO) while granting data access to the User-U and Accessor who need such data to perform their usual and customary business functions. The method and system completely control the User's access to the Private Data Owner's Private Data by replacing Identifying Information for the User-U, Individual-I, Accessor and PDO with pseudonyms. This assures the overall privacy of individuals, throughout the course of collecting, storing, accessing, analyzing and sharing detailed private records among different organizations engaged in providing and/or consuming services and/or products. Access Control Rule Sets ("ACRS") consist of instructions which prescribe the terms and conditions for permitting Users to access the PDO's Pseudonymized and Actual Private data in accordance with the rules governing their authorization to access such data.

5 Claims, 8 Drawing Sheets

U.S. PATENT DOCUMENTS

| | | | |
|---|---|---|---|
| 2003/0177132 A1* | 9/2003 | Thomas et al. | 707/100 |
| 2003/0190046 A1* | 10/2003 | Kamerman et al. | 380/286 |
| 2004/0199782 A1* | 10/2004 | Arnold | 713/200 |
| 2004/0210770 A1* | 10/2004 | Sanin et al. | 713/201 |
| 2005/0021519 A1* | 1/2005 | Ghouri | 707/9 |
| 2010/0070309 A1* | 3/2010 | Deede et al. | 705/4 |

FOREIGN PATENT DOCUMENTS

| | | | |
|---|---|---|---|
| DE | 10327291 A1 * | 2/2005 | |
| WO | WO 03/005639 | 1/2003 | |
| WO | WO 03/005639 A1 * | 1/2003 | |

OTHER PUBLICATIONS

U.S. Appl. No. 10/746,825 dated Dec. 24, 2003.

Eyal Kushilevitz et al., Replication Is Not Needed: Single Database, Computationally-Private Information Retrieval; Proceedings of Thirty-eigth Annual IEEE Symposium on the Foundations of Computer Science (FOCS-97).

* cited by examiner

USE OF PROXY SERVERS AND PSEUDONYMOUS TRANSACTIONS TO MAINTAIN INDIVIDUAL'S PRIVACY IN THE COMPETITIVE BUSINESS OF MAINTAINING PERSONAL HISTORY DATABASES

Conversion of Provisional Application No. 60/396,560—Proxy Servers and Pseudonymous Transactions to Maintain Individual's Privacy in the Competitive Business of Maintaining Personal History Databases—Hers/Radin/Madan

CROSS REFERENCE TO RELATED APPLICATIONS

The present application is related to U.S. Pat. No. 5,754,938 entitled: Pseudonymous Server for System for Customized Electronic Identification of Desirable Objects.

The present application is also a conversion of Provisional Application No. 60/396,5620 entitled Proxy Servers and Pseudonymous Transactions to Maintain Individual's Privacy in the Competitive Business of Maintaining Personal History Databases.

ABBREVIATIONS AND DEFINITIONS

Abbreviations:

ACRS: Access Control Rule Sets—Sets of Rules that control a User's access to data.

ATY Attorney—includes Plaintiff Counsel, Defense Counsel, Coverage Counsel, Mediation Counsel, Transaction Counsel and specialized co-counsel all of whom have an obligation to protect the confidentiality of the client's data.

CLM claim Staff—including claim Handler and claim Hierarchy up to claims Vice President.

DURS: Data Usage Rule Sets—Sets of rules that determine the manner in which Private Data can be used.

FLD: Field Investigator—gathers information from the field for CLM and ATY.

I—Individual—person whose data is being accessed (as opposed to U-User—person who accesses data)

ID—Identification

II—Identifying Information—information that can be used to reveal the identity of a person.

Insco—Insurance Company

FLD—Field Investigator

FS-Data—File Specific Data—includes Identifying and Non-Identifying data indexed to a File ID.

HIPAA—Healthcare Information Portability and Accountability Act

Master Contact Data—Identifying Information Maintained in a "Contact" Database

NPI—Numerical Person Identifier

PD—Private Data

PDO—Private Data Owner

S—Server

SD—Subscriber Database

SO—Subscriber Organization

UID—Unique Identifier (may be UNID or alpha-numeric)

UNID—Unique Numerical Identifier

UNID—ACRS Controller Database—Single Database that controls the assignment of UNID's and ACRS's among one or more Server Databases.

U-User—person who accesses data (as opposed to I-Individual—person whose data is being accessed)

UUNI Universal Unique Numerical Identifier (e.g. Social Security No.)

Definitions

Accessor: A Person or Organization that accesses data (if the Accessor is a Person, then this term is synonymous with U-User—Person who accesses data).

Claim: a request or demand for money or services.

Claim Services: services provided by claim Professionals and other service professionals in connection with the Administration, Processing and Adjudication of a "claim."

Consumer—person or organization that consumes a product of service. (as opposed to Provider—person or organization that provides a product of service).

Database Synchronization—Data disclosure and replication from one Server Database to another Server Database based on ACRS.

"De-identifying" or "Pseudonymizing" Information: these terms are used interchangeably and typically, but not exclusively, within the context of preventing identification of a PDO's PD by a User. However, it could also be implemented to protect the identity of any entity in the SD.

File: A collection of data and documents concerning a particular matter or transaction and associated with a File UID.

Healthcare Services: services provided by physicians, nurses and other healthcare service professionals.

Legal Services: services provided by lawyers and other claim, legal or conflict resolution service professionals at the level of a transaction, claim or conflict, irrespective of whether the conflict is resolved by litigation, negotiation or alternative dispute resolution ("ADR") process such as mediation or arbitration.

An "Organization": an entity consisting of two or more persons that is identified by an Organization UID and an Organization Name. For example, a corporation, partnership, family or law office with 1 lawyer and 1 secretary is an "Organization" (as opposed to a Person)

Other Non-Legal Professional Services: services provided by non-legal service professionals, including but not limited to healthcare, real estate, financial services, clergy, not-for-profit organizations, information technology, intellectual property, etc.

Person/Organization (Person/Org) Data:

"Person/Org Data": data concerning or referring to an Individual Person or "Person Group."

A "Person": a natural person (male or female) who is identified by a Person UID and at least one First Name and Last Name (as opposed to an Organization) A "Person Group" may be an "Organization" or a "Non-Organization Person Group Entity" (e.g. Address, Insurance Policy)

"Private Data": data concerning or referring to an individual and information that can be used to potentially identify an individual, including data which may be used to link an individual's non-public data records to his/her public data records.

Provider—person or organization that provides a product of service (as opposed to Consumer—person or organization that consumes a product of service).

"Service Provider"—person or organization that provides a service

"User"—Expanded Definition: A "User" is a person who accesses data about an Individual (or PDO) and whose data may also be accessed as an Individual (or PDO). In the preferred embodiment, audit trails may be created and maintained by the present system for all Individuals, Users and Accessors/Organizations that have a relationship with the system. Accordingly, the preferred system implementation provides means for observing, tracking, collecting and recording all identifiable information regarding Individuals (behavioral and non-behavioral) within the confines of each organization as well as across multiple organizations with which the Individual interacts and which are each uniquely identifiable via the use of UID's, UNID's, UUNID's and/or (in, theory) Private Data elements. In summary, all "Users" are also Individuals whose data may be accessed from the system and Individuals are also Users when they are accessing data from the system.

FIELD OF THE INVENTION

The Invention addresses the challenges presented to all business and government operations by Personal data privacy rules and regulations. The Invention preserves data privacy for the Individual-I and Private Data Owner (PDO) while granting data access to the User-U and Accessor who need such data to perform their usual and customary business functions. The Invention addresses the issues faced by Providers and Consumers of Products and Services who need to access and use Private Data owned by the Private Data Owner who may be both a Provider and Consumer of services and/or products. The Invention relates to privacy protected and rule/regulation (e.g. HIPAA) compliant access to data and use, collection, storage and communication of data among multiple Accessors, such as consumers and providers of services and products, that may include claims services, legal services, conflict resolution services, risk management and transaction management services. The Invention automates data privacy policy enforcement, data access auditing, regulatory (e.g., HIPAA) compliance, data privacy liability protection, risk management and the exchange of data over Consumer and Provider networks and knowledge management systems.

The Invention has far reaching applications to all areas of services (e.g. Claim, legal, healthcare, insurance, government, etc.) and products (e.g. insurance, transportation, consumables, durables, etc.). Since the Individual's decisions in connection with Marketing, Managing, Consuming and Providing services and products are often based on large volumes of data that can be accessed from multiple sources, the Invention is needed to secure the data needed by the Consumer to make such decisions and by the Provider or Marketer to advocate the merits of each such decision. Specific claims shall be addressed to data privacy in connection with Consumers and Providers of services in the areas of claims, Legal, Conflict Resolution, Healthcare, Insurance (both property and casualty and life and health), Real Estate, Not for Profit entities and Government.

BACKGROUND OF THE INVENTION

Personal data privacy rules and regulations present significant challenges to all business and government operations. Solutions are needed that preserve data privacy for the Individual-I and Private Data Owner (PDO) while granting data access to the User-U and Accessor who need to access such data to perform their usual and customary business functions.

Along with the emergence of the digital revolution, a nearly ubiquitous transformation is well under way, which is redesigning the way companies interact and transact business. A direct consequence of this changing business infrastructure is a plethora of digital data records concerning individuals, which are proliferating on a vast scale. These records are maintained in various databases at various locations and across nearly every company and organization with whom an individual interacts. These digital records include private and public information about individuals whose data are needed by organizations, which are either Providers or Consumers of services in connection with a variety of industries, including Legal, Healthcare, Financial, Government and other industries which require strict adherence to rules regarding the confidentiality of a Private Data Owner's (PDO) data.

The digitization and ease of transferability-via communication media of vast quantities of Private Data associated with Consumers of healthcare, legal, financial, government and other services enable business process efficiencies and economies of scale, while significantly increasing the risk that the individual's personal data privacy will be violated. Such privacy violations may be intentional or unintentional and may often be undetectable and untraceable.

Government regulation can be expected to continually impose more and more strict requirements for the service Provider to protect confidential Consumer information and enforce stringent rules in connection with the collection, storage, usage, transferability, presentation and integration of the Consumer's Private Data. Such regulations also have the potential to hinder and interfere with the efficiency of commercial operations and result in the imposition of heavy economic burdens on the Provider who must conform to their mandate. Both Providers and Consumers may be subjected to significant legal exposures as a consequence of alleged violations of privacy laws and regulations while they incur significant expense to comply with such laws and regulations. Some of the industries that are especially burdened by privacy regulations, include (but are not limited to) industries such as insurance, legal, government and healthcare which routinely provider and/or consume:

"claim Services";

"Legal Services";

"Healthcare Services";

Conflict Resolution Services;

"Risk Management Service"; and

"Transaction Management Services."

"Transaction Management" may include any business or personal transaction, such as healthcare, real estate, insurance, intellectual property (e.g. patent filing, trademark filing, etc.), family (e.g., marriage, adoption, etc.), etc.

Many service/product Providers are often Consumers within a "supply chain" of transactions. For example, a retail store is a Consumer of products at wholesale and a Provider of products at retail. Similarly, organizations, such as insurance companies or law firms, may be both Consumers and Providers of Claims Services and/or Legal Services.

Organizations that both consume and provide Claim Services and Legal Services include property and casualty insurance carriers, life and health insurance carriers, workers compensation insurance carriers, healthcare professionals and facilities and medical malpractice insurance carriers. Government entities are a significant Consumer and Provider of claim Services and Legal Services. Courts and Administrative agencies are massive Consumers and Providers of Legal Services and Conflict Resolution Services. Just about anyone in business today is a Consumer of claim Services, Legal Services and Conflict Resolution Services.

The present problem may be exacerbated by various legislation and regulation affecting the privacy and confidentiality of Private Data. Many business operations can be adversely impacted, as burdensome legal and regulatory requirements interrupt the efficient and effective flows of data (statistical and otherwise) among various Organizations and Individuals. Further limitations and restrictions on the Provider's and Consumer's ability to access and exchange data in order to provide and consume products and services in the usual and customary (and efficient) manner, present significant economic threats to service Providers and Consumers and the vast scope of entities' interests which they represent. The failure to properly conform to legal guidelines in order to protect administrative-level efficiencies can exacerbate the legal liability of the Provider who allegedly failed to properly protect the privacy rights of an Individual.

Digital Records maintained about an individual may include "Private Data" as defined above. Private Data may include non-public data such as the individual's history of medical treatment, history of financial transactions and other confidential and potentially sensitive personal information. Private Data may also include "Public Data", such as Litigation Records, Motor Vehicle Records and other data maintained in publicly available databases, if such "Public Data" can be used to link an individual's non-public data records to his/her public data records. For example, "Private Data" may include de-identified portions of a person's public data records (such as the person's address and gender) that could be used to reveal portions of the person's Private Data record (such as a confidential communication from public health authorities concerning an infectious disease). Information that can be used to reveal the identity of a person is called "Identifying Information" (or "identifying I or I'").

During the course of consuming or providing various services, it is often necessary to disseminate a person's Private Data and Public Data to third parties. For example, the dissemination of Private Data by Claim Service and Legal Service professionals working for law firms, insurance companies and health care providers can threaten the privacy rights of the Private Data Owner ("PDO"); i.e., the person whose Private Data is being disseminated. Such disclosure could potentially have damaging personal consequences to the PDO and subject the disclosing organization that possesses and releases the PDO's Private Data to severe legal/regulatory consequences and civil/criminal liability. For example, a medical or legal claim may involve the use of the plaintiff's medical records. Specifically, in the case of a medical malpractice claim or other litigation against a health care provider, Private Data must be disclosed to different parties such as legal representatives for each party, expert witnesses, non-party witnesses called by various parties to testify on their behalf, private investigators investigating allegations of fraud and neutrals, such as mediators, arbitrators, judges and juries.

During the course of rendering Legal Services to a physician defending a medical malpractice claim, the plaintiff's claims, legal and medical history and financial records may need to be disclosed to the defendant and the defendant's legal representatives. The health care provider's claims and legal history may need to be disclosed to the plaintiff and the plaintiff's legal representatives. In addition, if treatment and/or healthcare-related services have been rendered by a clinic, hospital or other health care entity, data regarding claims, legal and medical history and financial records may need to be disclosed to all parties and their legal representatives.

In criminal cases, particularly those of a sensitive nature (e.g., rape, incest, sexual assault, hate crimes or crimes involving threats of physical violence), as well as in other types of privacy-sensitive situations (e.g., involving victims of government power abuse, political controversy, activism or terrorism, participants in witness protection programs, etc.), it may be desirable for plaintiffs, defendants and witnesses to maintain a state of pseudonymity. Nevertheless, documents containing identifying information must be maintained and shared among the parties to the legal proceeding and their legal counsel.

Concerns about the privacy of Private Data, especially healthcare-related Private Data, have escalated over the years, giving rise to governmental regulation first initiated throughout the European Union and now in the United States. At the time the present disclosure was written, there are numerous regulations being promulgated under various statutes, such as the Healthcare Information Portability and Accountability Act (HIPAA), which govern all forms of Private Data collection, storage and access. These Statutes and Regulations may prescribe rules for securing the PDO's authorization and procedures that must be followed before Private Data can be properly disclosed by the disclosing entity to a third-party.

These regulations may require that healthcare providers and their trading partners maintain a privacy policy that prevents disclosure of Private Data to third parties, without adherence to strict data security and privacy requirements. Such requirements may include stringent compliance with rules for securing the express written consent of the PDO to the release of Private Data and rules that govern the collection, maintenance and access to healthcare-related Private Data, especially Private Data that may advertently or inadvertently reveal the identity of the PDO. Consequently, the collection, storage, use and exchange of Private Data may be severely impacted by its identification with and traceability to the PDO. There are other statutes and regulations that govern the security and privacy of financial transactions and provide rules that strictly regulate the release of Private Data within commercial sectors.

Statutory and regulatory requirements that regulate third-party access to Private Data can adversely impact the efficiency, effectiveness and economic costs of business processes, while they increase the overall risk of doing business. Many businesses now face potential liability for the unauthorized disclosure of Private Data where no such liability ever existed before. As a result of data privacy rules and regulations, the Provider may also incur increased liability by attempting to perform services without access to the full and complete data that the Provider may need to adequately perform those services. These significant risks have resulted in the development of data privacy insurance products and services.

On Apr. 4, 2002, the American Association of Health Plans (AAHP) released a report conducted by Pricewaterhouse- Coopers that identified the specific factors responsible for driving costs higher in the United States health care system in 2001. The report examined health care spending during 2001 and found that the average increase in health insurance premiums was 13.7 percent. PricewaterhouseCoopers attributed much of the rise in health care spending to the following factors:

Mandates and government regulation: 15 percent-$10 billion

Impact of litigation: 7 percent-$5 billion

Fraud and abuse and other cost drivers: 5 percent-$3 billion

This study, based on 2001 data, did not address the significant additional cost anticipated from compliance with HIPAA and other privacy-related regulations. More (not less) data is needed to reduce the costs associated with the reported increases in healthcare spending in 2001. Nevertheless, privacy-related regulations can severely limit the Provider's access to the data needed to better manage the costs of government regulation; litigation, fraud and abuse. Unless a robust technical approach can be introduced which enables practical methods for the Provider and Consumer to access and use the PDO's data records, it will become more and more difficult to conduct business within the environment created by legislation and regulation affecting the privacy and confidentiality of Private Data. It will be nearly impossible to manage the costs associated with government regulation, litigation and fraud. Potentially, the time and expense required to perform routine and basic business processes within the constraints imposed by more and more strict privacy rules can adversely impact both the efficiency and effectiveness of all business operations. In order for service Providers and Consumers to stay competitive or even marginally survive in business, it will be of paramount importance to design and implement proper technical infrastructures to conform to the privacy-related regulatory requirements in such a way as to maintain the efficiency and effectiveness of standard businesses processes.

SUMMARY OF THE INVENTION

Personal data privacy rules and regulations present significant challenges to all business and government operations. Solutions are needed that preserve data privacy for the Individual-I and Private Data Owner (PDO), while granting data access to the User-U and Accessor who need such data to perform their usual and customary business functions. The proposed method and system completely control the User's access to the Private data Owner's ("PDO's") Identifying Information by replacing Identifying Information for the User-U, Individual-I and Private Data Owner (PDO) with pseudonyms. This assures the overall privacy of individuals, throughout the course of collecting, storing accessing, analyzing and sharing detailed private records among different organizations and persons engaged in providing and/or consuming services and/or products.

The System protects the PDO's personal privacy in that it de-identifies the PDO's Individual Identifying (II) data in such a way as to enable third parties to enjoy many of the benefits of accessing individual digital data records. This may include establishing direct contact with the customer through various communication media, such as email or telephone. In addition, certain third party vendors (such as insurers, attorneys and health care providers) need to exchange the PDO's data among themselves. Access to needed data may be effectively provided, while access to the PDO's Identifying Information or other protected portions of the PDO's Private Data records may be restricted in order to preserve the PDO's privacy. The preferred technical solution proposed herein embodies systems and methods for achieving these objectives.

Access Control Rule Sets ("ACRS⇆") consist of instructions which prescribe the terms and conditions for granting a User or third party Accessor authorization to access portions of the Individual's Private Data record and/or associated Identifying Information. Unique ID's are used to link and validate different vendors' database entries for the same individual, even though control ACRS among multiple Servers or Communication devices and thereby permit Users to access the PDO's Pseudonymized and Actual Private data in accordance with the rules governing their authorization to access such data.

The solution proposed herein presents a compelling industry/application transparent methodology which substantially preserves the advantages that organizations currently enjoy regarding their access to an individual's Private Data, while creating an enabling framework which preserves the individual's privacy rights and assures the organization's compliance with various regulations, rules and guidelines.

At the time of writing the present disclosure, certain privacy-related statutes and regulations, such as the regulations promulgated under HIPAA, require a clear chain of custody to ensure that the PDO's Private and Public Data and Individual Information maintained in the Service Provider's Subscriber Database (SD) are provided only to Service Providers and System Users specifically authorized by the PDO to receive the PDO's Private Data. These requirements may include, but are not limited to, acquiring and maintaining a written authorization signed (or digitally signed) by the PDO, confirming that a particular User or type of User is authorized to access certain confidential information concerning the PDO from the SD.

The problem requires a system and method that automates compliance with the organization's data privacy and security policy, which is entrusted with maintaining and enforcing these inherent privacy protections on the part of the PDO, while enabling the enterprise to transact business and grant appropriate third-party access to a PDO's Private Data and Public Data without encumbering resources and significantly increasing the cost of doing business. We propose a system and methodology enabled by a technical framework, which allows service Consumers and Providers (such as Consumers and Providers of claims services and legal services and third-party vendors to the claim Service and/or Legal Service File) to continue to harness the full value of the PDO's Private Data which may include the collection, maintenance, analysis and exchange of the PDO's Private Data, while facilitating communication with and/or about the PDO. Extremely valuable and often mission-critical functions and associated functions (which would ordinarily occur in the absence of privacy regulation) are performed in such a way that protects the privacy of the individual's Private Data by preventing unauthorized third parties from accessing the PDO's "Identifying Information" ("II", sometimes also referred to as "Master Contact Data") such as name, address, telephone number, email address, social security number, occupation, date of birth, name of spouse, name of employer organization, etc.

It should be appreciated that one somewhat subtle yet critically important consequence of the proposed approach is a newly emerging paradigm. In addition to statistical and other information-related economies of scale, the Invention provides a variety of other potential direct benefits which particularly impact upon the PDO's privacy assurance at a system level, which may include (but are not limited to) the following:

1. By virtue of the ability to employ and leverage much more comprehensive robust and diverse ("big picture") statistics, the risks of intrusion into the PDO's privacy should be reduced. In particular, assuming that privacy protection safeguards are effectively implemented in a cross-database data transfer and associated analytical scheme, it should be possible to substantially minimize the annoying and potentially damaging effects of false triggering of fraud detection and other predictive data analysis functions. In extreme cases, erroneous flagging events may potentially result in the unnecessary or inappropriate issuance of warrants, subpoenas or other requests or demands from government agencies or private organizations which authorize investigators to gain access to highly private and sensitive personal information. In the post 9/11 political climate, issues relating to the government's rights to access personal information are likely to emerge at the forefront of the public's concerns over privacy.

2. Potential violations of personal data privacy may be even further reduced by virtue of the proposed system's ability to leverage the use of Private Data at a much more collective level. Accordingly, it may be possible for an investigator to acquire the desired data without the use of data access warrants or other intrusive investigative methods.

3. As will be detailed further below, the system's ability to perform centralized aggregation and analysis and automated statistical evaluation of potential breaches of the PDO's data privacy can also provide the SO with: a) a comprehensive, statistically substantiated, system-wide data privacy analysis with identification of specific potential and actual privacy breaches; and b) an automated, statistics-based remediation plan with recommendations for curing potential and actual breaches. The Provider is also able to observe and measure the potential trade-offs between certain levels of privacy protection and information access and, conversely, the impact of limiting access to certain Private Data as imposed by the User's/Accessor's associated ACRS.

BRIEF DESCRIPTION OF THE DRAWINGS

The above and other beneficial features of the invention will be apparent from the following description, of which.

DETAILED DESCRIPTION OF THE INVENTION

A. Proxy Server Architecture

Figure 1:
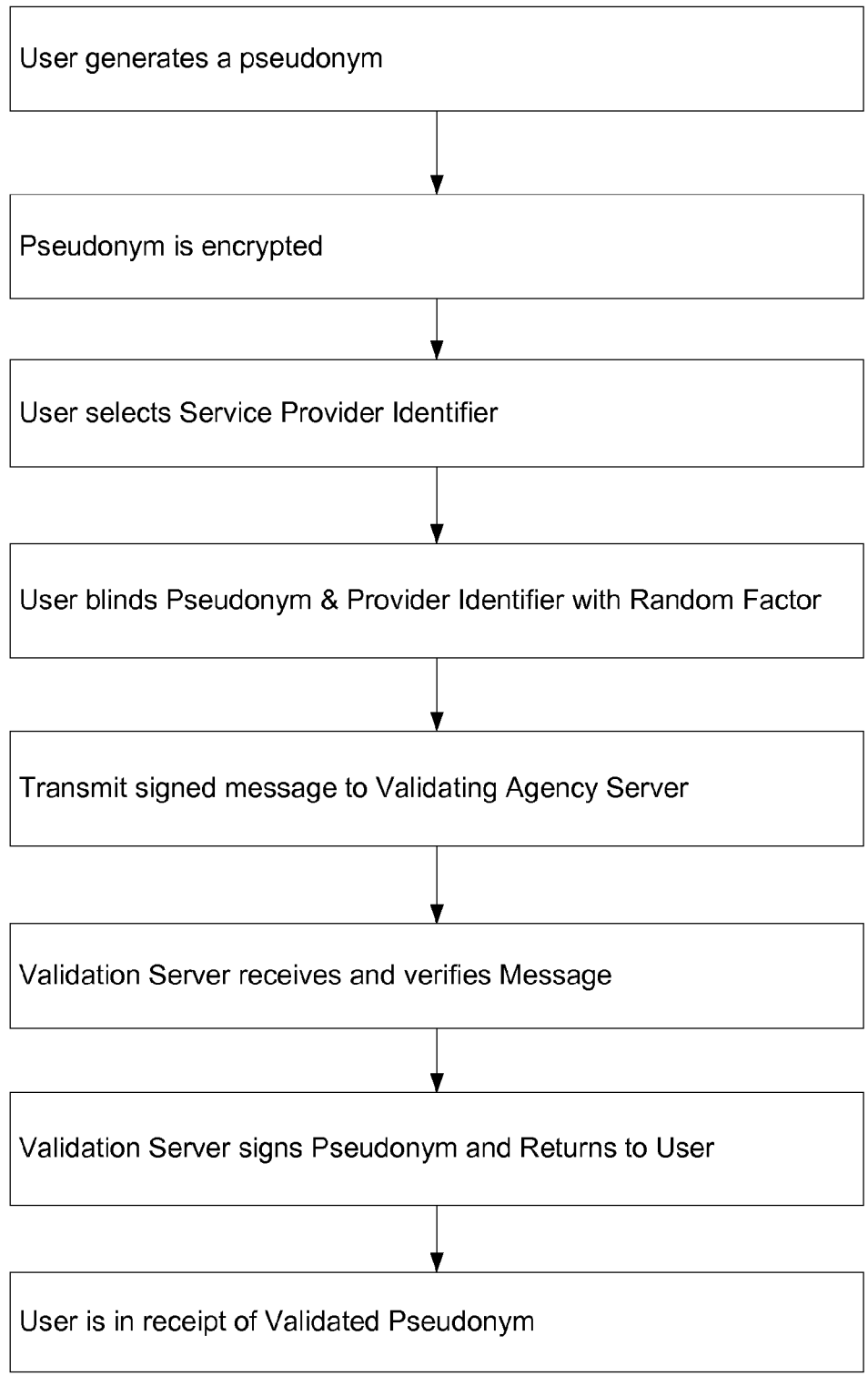
FIG. 1 depicts the preferred embodiment's technique for creation and validation of a user's unique pseudonym.
Figure 2:
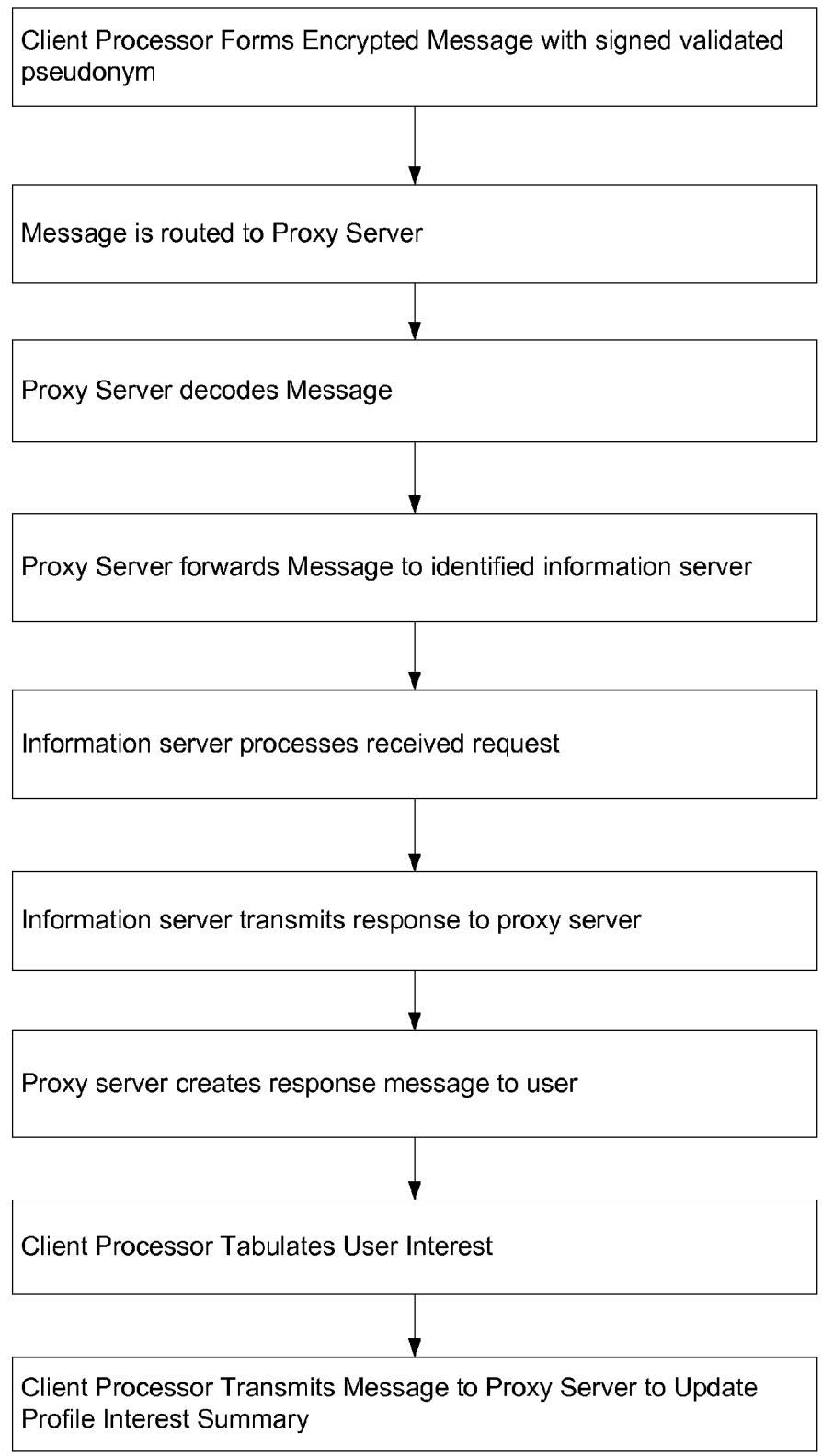
FIG. 2 depicts multi-step protocol for routing a pseudonymized message request by the Accessor (User U) through the proxy server, re-identifies pseudonymized data, routes the re-identified message to the information server and routes the response to User U.
Figure 3:
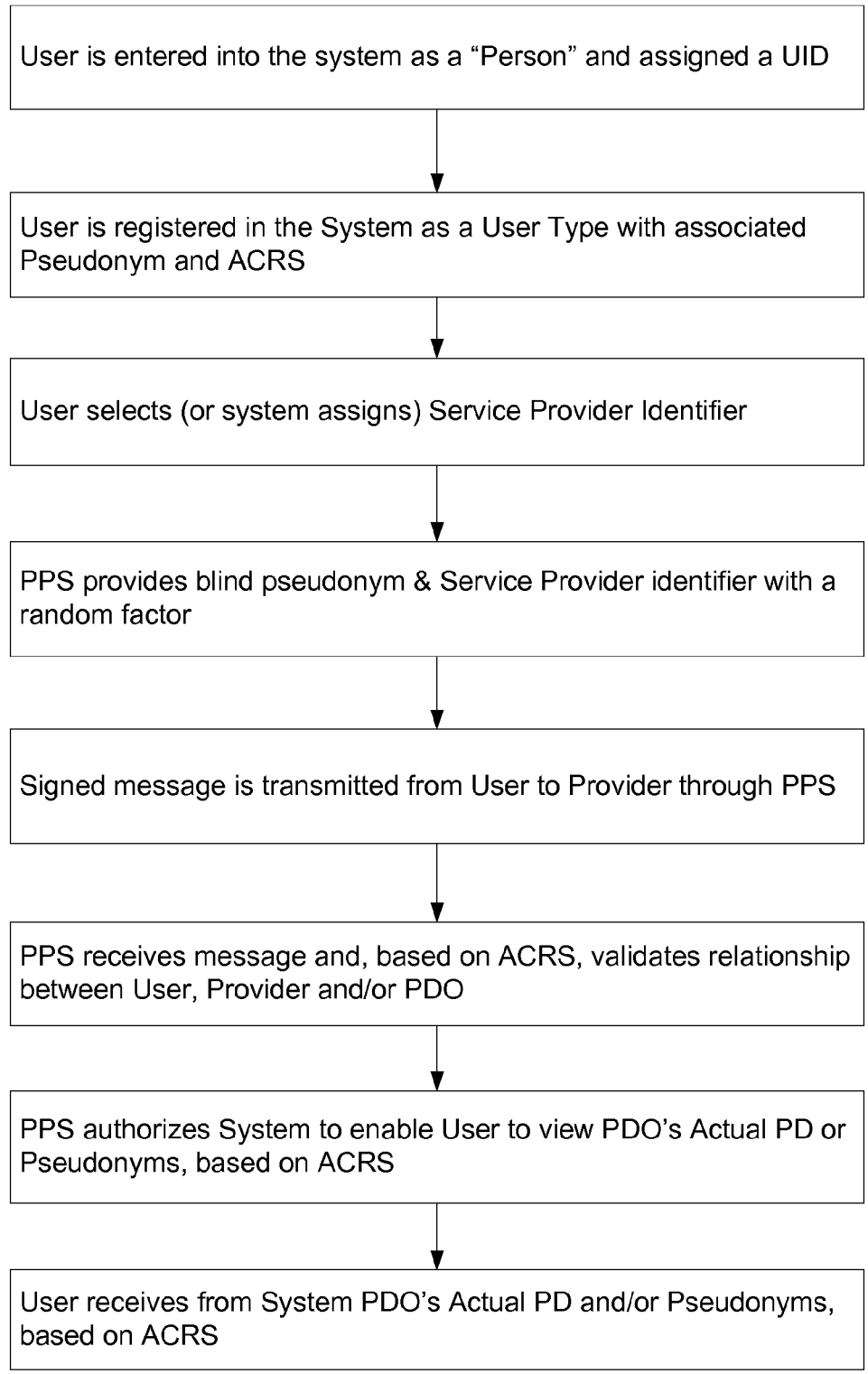
FIG. 3 depicts a technique where the User Creates and Validates the User's UID that can be used as a Pseudonym and ACRS that govern the User's Access to Actual vs. Pseudonymous Data.

A Preferred Embodiment for the Effective Implementation of the Present Methodology While a method of using individual personal information presents many advantages to individuals and users of such Private Data, there are important privacy issues for both users and providers that must be resolved if the system is to be used freely by users without fear of breaking laws of privacy. It is likely that individuals will desire and government mandates will require that some, if not all, of the individual-specific information in their profiles remain confidential. The confidential information is disclosed only under certain circumstances and only to a handful of parties and only the part, which is needed by each of these parties. However, a complete privacy and inaccessibility of individual information would hinder the commerce and would deprive the user of many of the advantages derived through the use of individual-specific information. In many cases, a complete and total privacy is not desired by all individuals. Indeed, the usefulness of the technology described herein is predicated upon the free uninhibited access to useful and critical information necessary to perform the desired third party (or multiple third party) data transfer and analysis and/or communication between themselves and/or the entity to which the information pertains. However, the technology proposed has the ability to collect and compare data about many individuals without the loss of privacy by sharing the Private Data. A compromise between total individual anonymity and total public disclosure of the individual's profiles is a pseudonym.

A pseudonym is an artifact that allows a provider to communicate with an Individual and build and accumulate records of the Individual's preferences over time, while remaining ignorant of the individual's true identity. The individual can use a pseudonym to keep his/her identity, data records and documentation (e.g. medical or legal records) private. A pseudonym system also provides for digital credentials, which are used to guarantee that critical Private Data about an individual represented by a pseudonym are not changed, as the Individual's personal records are accessed by many parties.

Our method solves the above problems by maintaining an individual's privacy by combining the pseudonym granting and credential transfer methods by a mechanism called proxy servers (Chaum and Evertse, Chaum 1981). The pseudonymous server technology (also called "proxy server technology") is a broad reaching architectural metaphor by which personal user information is maintained, managed and used in accordance with very specific usage parameters. At an abstract level, the pseudonymous proxy server is a secure and trusted server, which manages the individual I's private and possibly public information (PD) in a completely secure cryptographic fashion.

The pseudonymous proxy server can be viewed as an intermediary and trusted third party who mediates and controls data transmissions which contain records about an individual, an organization, two or more individuals or two or more organizations. In addition, the proxy server communicates via a secure data communication link and (most typically) is simply an additional server which is interposed between two or more parties which transmit personal information relating to an Individual.

A proxy server is a mediator which keeps the identity of the individual private by transferring to third parties the history of the Individual employing only the Individual's pseudonyms, without disclosing the Individual's Private Data. Each proxy server communicates with the third party and/or possibly another server, in which an authorized entity maintains information about the Individual in a database. The database assigns the pseudonyms to the individuals with the implementation of a set of one or more proxy servers distributed throughout the network N.

Each proxy server (for example, S2) is a server which within the scope of our implementation schemes communicates with clients and other servers S5 in the network either directly or through anonymizing mix paths. Any server in the is network N may be configured to act as a proxy server in addition to its other functions. Each proxy server provides service to a set of users, which set is termed the "user base" of that proxy server. In a preferred present case as proposed, these users might be the third parties such as agents from law firms or insurance companies, who are interested in the Individual's Private Data. For purposes of the present disclosure, the present inventors have emphasized by elaborating upon the potential readily, implemented security individual privacy protecting aspects of the proxy server enabled network architecture in as much as such benefits would be highly desirable within the present scheme. Of course, it would be obvious to the skilled reader that notwithstanding in the preferred embodiment as herein present, the proxy server enabled network architecture may be implemented in a variety of (including simplified) variations to that of the presently disclosed preferred embodiments and in this way such preferred design configurations are presented so as to in no way limit the scope of the presently disclosed system and method or that of any of its associated application specified or objective oriented implementations as herein provided.

A given proxy server provides four kinds of service to each user U in its user base, as follows:

1. The first function of the proxy server is to bi-directionally transfer communications between user U and other entities such as information servers, possibly including the proxy server itself, and/or other users. These servers typically contain the individual I's personal information in addition to other types of data. Specifically, letting S denote the server that is directly associated with user U's client processor, the proxy server communicates with server S (and thence with user U), either through anonymizing mix paths that obscure and further protectively secure the identity and other concealed information of individuals to the user U, in which case the proxy server knows an individual only through a secure pseudonym, or else through a conventional virtual point-to-point connection, in which case the proxy server may perhaps know the individual I by its true identity. However, it assigns the individuals a pseudonym and may make accessible to user U, only the pseudonym and the rest of the non-identifiable personal information as subject to and appropriate with individual I's Access Control Rule Sets ("ACRS"). In the latter case, the pseudonym may be regarded as a non-secure pseudonym of the individual I. In one extension of the present scheme, the connection between the client processor and server S is interposed by proxy server S2 and (if desired) with an anonymizing mix path which may be interposed between the information server and S2. In the former scenario (as in the case of a virtual point-to-point connection) proxy server S2 knows the true identity of user U while in the latter, the proxy server S2 knows user U only through a secure pseudonym. However, in either case, it assigns the User U a pseudonym relevant to the prospective accessor(s) of user U and/or context of that connection. At a minimum, the proxy server makes accessible to the Accessor and/or User only the appropriate pseudonym and other non-identifiable information as authorized by User's ACRS and/or access control instructions governing that Individual I's PD obtained in the provider's associated database and/or data log(s).

2. A second function of the proxy server is to collect and/or receive and record individual-specific information associated with individual I. This individual-specific information includes an individual's identifiable personal data and non-identifiable personal data as well as a list of ACRS specified by the parent data owner, as described below, and a set of one-time return addresses for the individual I that can be used to send messages to the individual I without knowing the individual I's true identity. All of this individual-specific information is stored in a database that may be reached by using the individual pseudonym (whether secure or non-secure) on the proxy server.

3. A third function of the proxy server is to act as a selective forwarding agent for unsolicited communications that are addressed to the individual I. The proxy server forwards some such communications to the individual I and rejects others, in accordance with the ACRS specified by the individual I.

4. The fourth function of the proxy server is to act as a firewall protecting the Individual's Private Data against unwanted (possibly malicious) intrusions which may result in unauthorized changes of data in the Subscriber Database. From the individual's perspectives our system provides security, in that it can guarantee that the individual's 'privacy is protected and yet he or she is able to receive information from various service providers. In the present proxy server system, the same basic system elements are provided, including ACRS provided by the individual who allows or disallows communication request by Accessor third parties, users U and individuals I, as well as access by such parties to data (complete or relevant discrete portions thereof) associated with the Individual I's data record. In the event various portions of the individual's data record reside across various proxy servers, the proxy server may function as a distributed server. (e.g., through the use of meta-data in the form of hyper-links) for purposes of the querying process while simultaneously preserving the security benefits of each portion of the data record residing on its associated proxy server. For example, an individual's ACRS may first allow or disallow access by a third party service provider (user U) to all or a certain portion of his/her Private Data record stored within the database or information server S1, based on the access control rules as enforced by proxy server S2. This example possesses a data base function which collects and/or retrieves the data record including such useful attributes as demographic data as well as "target profile interest summary" data. The data constituting the PDO's PD may include at a high (cross-industry level) both the "target profile interest summary" (which consists of a summarized form of the aggregated behavioral activities such as transactions of the individual I and all other potential types of data (relating to demographic, medical, legal/case history, etc.) in as much as certain types of behavioral data may be of relevant interest when accessed and/or analyzed by certain accessors. Based on these ACRS, the access to an individual's data may be subject, but not limited to (for example), the explicit identity or classification of the user U. From a user's perspective, the accuracy of the Private Data and the history of the individual are assured by digital credentials as well as ACRS from the individual that are incorporated in the system. The uniqueness of pseudonyms is important for the purposes of this application, since the personal history record gathered for a given individual must represent a complete and consistent picture of data regarding a single individual's Private Data and his/her activities over a reasonable time period.

B. Proxy Server Description

In order that an individual is assured by the data manager that some or all of the information in the individual's Private Data and the history remain dissociated from the individual's true identity, the proxy server operator employs as an intermediary any one of a number of proxy servers available on the data communication network N (for example, server S2). The proxy servers function to disguise the true identity of the individual from other parties on the data communication network N. The proxy server represents a given individual to either single network vendors and information servers or coalitions thereof.

A proxy server, e.g. S2, could, under certain cases, among a number of configurations, be a server computer with CPU, main memory, secondary disk storage and network communication function and with a database function which retrieves the target profile interest summary and access control instructions, associated with a particular pseudonym P, which represents a particular individual I, and performs bidirectional routing of commands. Information concerning an Individual (such as legal and medical history) may be routed to a given client (e.g. C) and other network entities (such as law firms or insurance companies) via network vendors V1-Vk and information servers I1-Im. Each proxy server maintains an individual's history associated with each allocated pseudonym in its pseudonym database D. The actual individual-specific information and the associated pseudonyms may or may not be stored locally on the proxy server. They may also be stored in a distributed fashion and be remotely addressable from the proxy server via point-to-point connections.

The proxy server supports two types of bidirectional connections: point-to-point connections and pseudonymous connections through mix paths (D. Chaum 1981). The normal connections between the proxy server and the information servers (for example, a connection between proxy server S2 and information server 14) are accomplished through the point-to-point connection protocols provided by network N as described in the "Electronic Media System Architecture" section of U.S. Pat. No. 5,754,938 by Herz et al. The normal type of point-to-point connections may be used between S2-I4, for example, since the dissociation of the individual's record and the pseudonym need only occur between the client C3 and the proxy server S2, where the pseudonym assigned to the individual is available.

The knowledge that an information provider (such as I4) communicates with a given pseudonym P on proxy server S2, does not compromise the true identity of the individual I. The bidirectional connection between the user U (e.g. a law firm), and the proxy server S2 can also be a normal point-to-point connection. However, it may be made anonymous and secure, through the consistent use of an anonymizing mix protocol (D. Chaum, 1981). This mix procedure provides untraceable secure anonymous mail between two parties with blind return addresses through a set of forwarding and return routing servers termed "mixes". The mix routing protocol, as proposed in the Chaum paper, is used with the proxy server S2 to provide a registry of persistent secure pseudonyms, by information providers I1-Im, by vendors V1-Vk and by other proxy servers to explore data in the individual's records in the proxy server's database on a continuing basis.

The security provided by this mix path protocol is distributed and resistant to traffic analysis attacks and other known forms of analysis which may be used by malicious parties who attempt to ascertain the true identity of a pseudonym bearer. The protocol could only be broken if a large number of parties who are highly skilled in cryptographically compromising complex systems were able to organize and conspire to do so maliciously and unlawfully. In addition, an extension to the method is suggested where the user can include a return path definition in the message so the information server 14 can return the requested information to the individual's processor. We utilize this feature in a novel fashion to provide for access and reach ability under proxy server control.

C. Validation and Allocation of a Unique Pseudonym

Chaum's pseudonym and credential issuance system (Chaum and Evertse, 1981), has several desirable properties for use as a component in our system. The system allows different pseudonyms with different organizations such as law firms and insurance companies. The organizations which are provided a pseudonym have no more information about the individual than the pseudonym itself and a record of personal information about the individual under that pseudonym. Additionally, credentials, which represent facts about a pseudonym, can be granted to a particular pseudonym and transferred to other pseudonyms that the same individual has been assigned.

Credentials may be granted to provide assurances regarding the pseudonym bearer's age, financial status, legal status, and the like. For example, credentials signifying "legal adult" may be issued to a pseudonym based on information known about the corresponding individual by the given issuing organization. Then, when the credential is transferred to another pseudonym that represents the individual for another part of personal history, presentation of this credential on the other pseudonym can be taken as proof of legal adulthood. Credential-issuing organizations may also certify particular facts about an individual's demographic profile, for example, by granting a credential that asserts "the bearer of this pseudonym: a) has never filed a medical malpractice lawsuit; or b) is middle-aged and has never sued an insurance company; or c) is forty year old and has successfully sued his auto insurance company twice". Simple digital signature-based credentials are efficient, low overhead methods that guarantee the sustained integrity and interoperability of certain facts about the user that are used to protect all or a portion of the PDO's Private Data.

Additionally, the method proposed by Chaum provides for assurances that no individual may correspond with a given organization or coalition of organizations using more than one pseudonym; that credentials may not be feasibly forged by a third party; and that credentials may not be transferred from one individual's pseudonym to a different individual's pseudonym. Finally, the method provides for expiration of credentials and for the issuance of "black marks" against Individuals who do not act in accordance with specifically prescribed rules (such as may be defined by legal, medical or insurance organizations). This is done through the resolution credential mechanism as described in Chaum's work, in which resolutions are issued periodically by organizations to pseudonyms that are in good standing. If an individual is not issued this resolution credential by a particular organization or by a coalition of organizations, then none of the other pseudonyms assigned to this individual will be issued a resolution credential either.

If this is the case, then the organization can use this lack of resolution credential to infer that the individual is not in good standing in his other dealings. In one approach, an organization (such as an insurance company) using this system may issue a list of quality related credentials based upon experiences, transactions and/or interactions with the individual. These credentials may serve a function similar to a letter of recommendation or a list of experiences in a resume. If, for example, such a credential is issued by multiple organizations, the values of these credentials could be averaged and otherwise analyzed statistically. This practical application-level utility and benefits of the above cryptography-secured credentials for protecting customer identity, reputation and associated business relationship data will be further elucidated and apparent in subsequently filed child cases which are forthcoming. In an alternative variation, organizations may be issued credentials from individuals such as customers, which may be used to indicate to other future individual's quality of service which can be expected by subsequent users on the basis of various criteria.

Proxy server is best implemented in a closed system, in which ACRS grant the User Access to data, based on the User's log-in entry to the closed system or database. However, Proxy Server may also be implemented in an open system, such as email, in which ACRS controls the de-identification and re-identification of data through encryption methodologies. Other open system communication media such as FTP, telephony, email, fax, telex, etc. may be alternative system implementation variations of an open system.

In the preferred approach, a pseudonym could be ideally implemented as a data record consisting of two fields. In a typical implementation, a pseudonym is usually a data record consisting of two fields. The first field specifies the address of the proxy server at which the pseudonym is registered. The second field contains a unique string of bits, e.g. a random binary number, that is associated with a particular individual. Credentials take the form of public-key digital signatures computed on this number, and the number itself is issued by a pseudonym administering server Z, as depicted, and detailed in a generic form in the paper by D. Chaum and J. H. Evertse (Chaum and Evertse, 1981).

Figure 4:
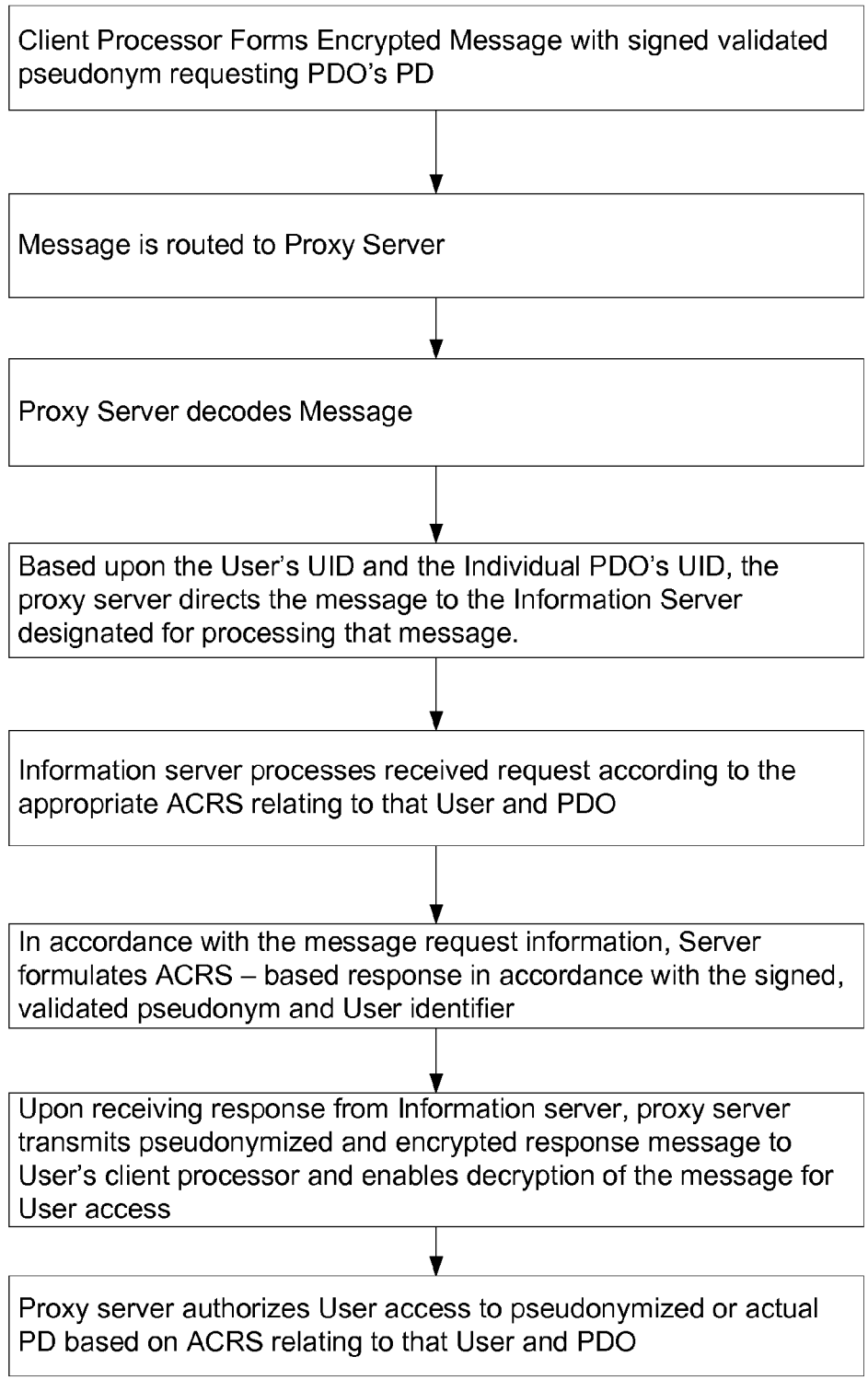
FIG. 4 depicts a technique in which a Pseudonymized Message is Routed through Proxy Server which Re-Identifies the Pseudonymized Data, Routes the Re-Identified Message to the Information Server and Routes Response to User in the form of Actual or Pseudonymous Data, based on the ACRS.
Figure 5:
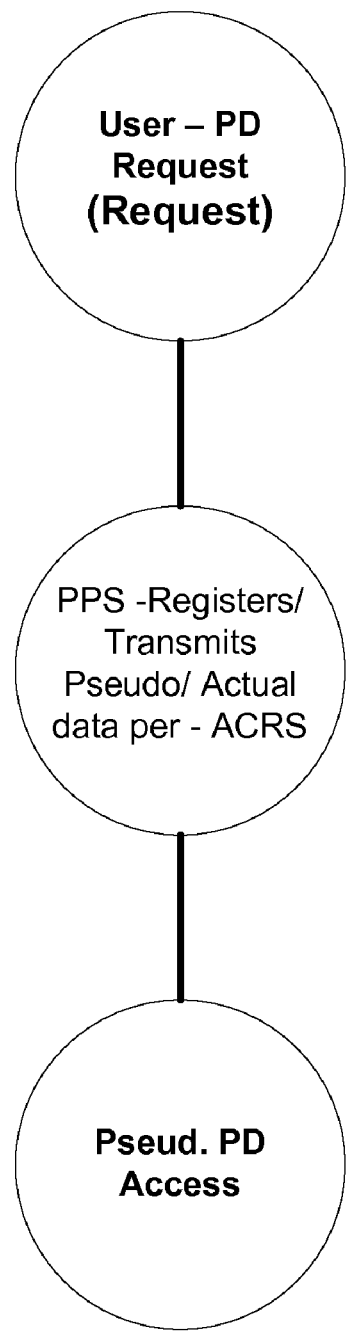
FIG. 5 depicts requester of Private Data (PD) by user U. Pseudonymous Proxy Server (PPS) that performs the functions of user identification and authorization of User U by UID or UNID, validates request, and grants access to User U to actual or pseudonymous data, based on the ACRS implemented by the PPS, which is also known as the U-ACRS controller.
Figure 6:
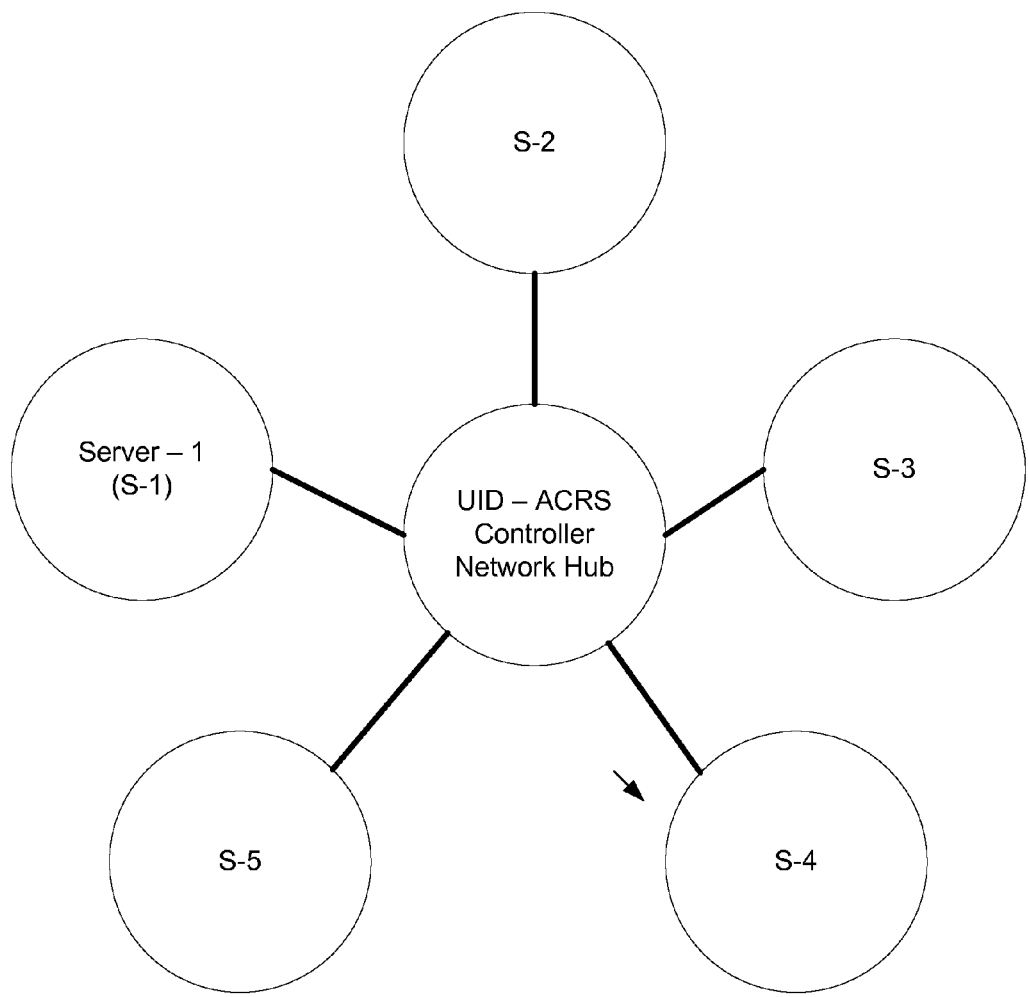
FIG. 6 describes UID-ACRS controller as a form of PPS, which controls UIDs and ACRS among multiple servers in a "hub and spoke" network configuration. The UID-ACRS Controller maximized control over all Individual UID assignments and Users' ACRS to maximize security, privacy and accountability when the User accesses Private Data (pseudonymous and actual per the ACRS).

Because a primary purpose for the use of credentials is in providing assurances of integrity (untamperability) of the PDO's data particularly in the process of transmission and transfer of such data (e.g., as applied in the server to server transfer scenario), the term "credential" as herein defined as a digitally signed data record can, of course, be broadly used for PDO data in general. It is possible to send information to the individual holding a given pseudonym, by enveloping the information in a control message that specifies the pseudonym and is addressed to the proxy server that is named in the first field of the pseudonym. The proxy server may forward the information to the individual upon receipt of the control message. See FIG. 4.

While the individual may be given a single pseudonym for all transactions, in the more general case, an individual has a set of several pseudonyms, each of which represents the individual with regards to data records relating thereto and/or in his or her interactions with several service providers and/or types thereof and the personal records related to the particular kind of service provider. All of the individual's data records and interactions with a given coalition can be linked if, and only if they happen to be conducted under the same pseudonym, and therefore can be combined to define a unified picture, in the form of an individual personal record vis-à-vis the service or services provided by said coalition.

In this case, the generic term, "coalition", may be defined to mean any group of service providers, such as a certain type of service provider and/or a group consisting of different types of service providers or Individuals who happen to possess common classifications of data (such as an insurer, employer, healthcare provider, law firm, etc). A "coalition-specific pseudonym" may be created as a response to a request on behalf of a service provider accompanied by the individual's authorization to allow a specified coalition of service providers to refer to that individual under a common pseudonym. This common pseudonym is ultimately granted to each service provider within the "coalition." However, in order to assure an optimal level of Private Data security, it is most advantageous if the pseudonym granted for each service provider is unique but traceable to the common coalition-specific pseudonym. This is accomplished by having the pseudonym granting authority issue both unique and coalition-specific pseudonyms as well as ACRS that control User access to PD at the User/Individual and/or Coalition level and transferability of PD between the Individual Service Provider and the Service Providers who constitute the Coalition.

In addition to the standard described protocol for pseudonym issuance (as follows) a separate private key is issued to each of the associated service providers in the coalition by which it becomes possible to link each unique pseudonym to a pseudonym which is additionally issued from server Z (see as follows) for that individual which is common for all members of that particular coalition. The coalition may be assigned ACRS that is different from the ACRS granted to each User, in accordance with the authorization granted by the Individual. Various scenarios can be expected to result from efforts to comply with the strict regulations outlined by national and local privacy regulations such as the Healthcare Information Portability and Accountability Act (HIPAA), that information pertaining to individual I may not be shared among different service providers (users U) without the explicit authorization of individual I which could be achieved in this case in accordance with the terms as dictated by the presently implemented ACRS.

In accordance with these literal guidelines, it is likely that pseudonymization of data records of individuals (under a common pseudonym) would not result in the elimination of the requirement for explicit user authorization prior to exchange of the individual-level Private Data between the associated service providers, users U. Even with explicit user authorization, each issued pseudonym corresponding to individual I remains both unique to each user U and unlinkable to any other pseudonym for individual I whereby each possesses information relating to individual I. Under conditions of explicit authorization by individual I, certain pseudonyms corresponding to that individual which are held by each individual service provider (user U) may share particular portions of individual I's personal records relating to the particular data requirements of each of the associated users U.

The set of users U are subject to explicit authorization by individual I in accordance with his/her access control rule sets (ACRS in the form of DURS) associated with each user U for purposes of dictating data exchange conditions set for those particular service providers (users U) for each explicitly defined portion of Private Data associated with individual I. His/her access control rule sets (ACRS) prescribe certain rule-based actionable response conditions, in response to such parameters as the identity and/or characteristics of the prospective recipient user, the associated proposed purpose of use and other contents, etc. In addition, the data disclosure actions associated with the access control restrictions which are triggered may include, but are not limited to the following parameters:

a. Certain portions or sub-sets of the individual I's Private Data record;

b. The identity (or alternatively, pseudonym or anonymous identifier) or the recipient user U to discloser user;

c. The identity (or alternatively pseudonym or anonymous identifier) of the discloser user U to recipient user U;

d. The identity (or alternatively, pseudonym or anonymous identifier) of the recipient user U's "database server containing individual I's disclosed Private Data record" to discloser user U.

e. The identity (or alternatively pseudonym or anonymous identifier) of the discloser user U's "database server containing individual I's disclosed data record" to recipient user U.

Access control rule sets (ACRS) may be prescribed by the User and/or Accessor and approved by the Individual. The ACRS may include various criteria such as particular conditions for apprising the Individual or User regarding specific events pertaining to data relating to the individual and/or User. This may include events relating to the individual, the User and/or third party Accessors. For example, the Individual may be informed pseudonymously that a pharmaceutical company (i.e. $3^{rd}$ party Accessor) is using the individual's data as part of a statistical study concerning the marketing of a particular pharmaceutical product by a particular salesperson/User. Stated more abstractly, ACRS may prescribe access to PD that is to be acted upon independently or on behalf of individual I by a third party user U). ACRS may also be used to process requests for data release on the part of individuals or Users and provide actual or pseudonymized data in response to such requests, either as file specific data or compiled statistical reports.

In accordance with the presently described scheme, the pseudonyms which reveal links with other pseudonyms possessed by other service providers users U, may be revealing of only certain subsets of individual I's Private Data associated with that given linkable pseudonym for individual I of the discloser and/or recipient user U. Thus, the pseudonym individual I, for example, containing a certain subset of individual I's Private Data may (at least in theory) not even be linkable to certain other data associated with a different pseudonym for the same individual I possessed by the same user U even though it may have been received from the same other disclosing user U. Moreover, as below suggested, each pseudonym may, in fact, be permanent (or more particularly permanent conditional upon individual I not terminating that pseudonym as an actively updated and accurate representation of that particular portion of his/her Private Data record) it may be temporary (e.g., limited to the duration of a present legal case or testimony thereof or one time, which, of course, constitutes an interaction between anonymous communicating parties). As such, so long as individual I's access control rule sets (ACRS) dictate unique access control restrictions for a particular piece of data or data sub-set, theoretically even a unique combination, of individual I's Private Data record, a separate pseudonym is mandated upon disclosure of the associated subject data to recipient user U. The access control rule sets meta-data associated with each associated disclosed piece of data pertaining to individual I then dictates the link ability privileges of the recipient user U to any other Private Data-bearing pseudonym to which recipient user U presently has access vis-à-vis the private key associated with that unique pseudonym which is disclosed to recipient user U as well as any additional request oriented access control restrictions or instructions.

Such instructions could also be in the form of meta data to recipient user U pertaining to the received data of individual. It is worthy to note that the intermediary which individual I entrusts with all or a specified sub-set of his/her Private Data record, as well as possibly authorization to dictate access control rule sets for all or a discrete portion of the data record for individual I, may be an intermediary, which is expressly assigned by individual I or it may be, in very typical practical scenarios, a particular user U which represents the interests of the user to another prospective recipient user U. Such a party could be the law firm providing individual I's personal legal counsel.

D. Updating of Individual's Data Record Maintained under an Active Pseudonym The methodology for performing data updating functions for data records associated with an active pseudonym are disclosed in detail in U.S. Pat. No. 5,754,938 entitled "Pseudonymous Server for System for Customized Electronic Identification of Desirable Objects", Herz, et al, in which the server S2 associated with the trusted (user authorized) intermediary and which possesses the access control instructions for the particular data originally disclosed to the recipient users U in accordance with the granting of appropriate network server access permissions, performs the appropriate remote updating of the relevant modified data entries in individual I's data record utilizing its own private key to the appropriate relevant pseudonym belonging to individual I.

There are, of course, example situations in which a given individual's collective records within a particular type of service provider, or even various types of service providers, may constitute important information for purposes of creating a unified picture of individual I's overall historical profile as exists across a variety of users U within a particular kind or kinds of service providers. For example, some, or often all data associated with individual I's complete medical history may need to become aggregated from a variety of health care providers from which she or he had previously received health care services. Or, in the second case, a defendant's attorney for individual I may often find it critical in a legal case to know the comprehensive legal medical histories of their client as well as legal medical histories of their client as well as perhaps other histories such as financial/credit, employment insurance, criminal and psychological.

E. Architectural Variations Supporting Other Applications Requiring Static and/or Dynamic Data Exchange of Individuals There are other illustrative examples in which aggregation of different historical data bases pertaining to individual I would be extremely advantageous, both within the present context of common or linkable associated pseudonyms and within the context of both static (historical) as well as dynamic data input statistics and their associated analysis. Assume, for individual data privacy/regulation reasons, that explicit actions and other data pertaining to the individual within the User's database could not be readily shared between disparate databases. Nevertheless, it may still be possible to transfer information to a central database which could be operated by, for example, a neutral disinterested third party or government entrusted operator. Such a neutral could aggregate information pertaining to that user and analyze such information for the benefit of not only the Individual, User and/or Accessor but for third parties (such as government entities or coalitions of organizations) as well. This could be useful for law enforcement to detect fraud, criminal activity or suspected terrorism.

For example, consider the cases pertaining to fraud detection in which data records pertaining to individual I across various credit card databases would be advantageous to the associated credit card companies collectively. It would be important to the credit card company to be able to assess (potentially in updated dynamic fashion) such parameters as propensity to commit fraud, e.g., based upon explicit and predicted variables ascertained from individual I's credit card transaction history and other financial and business dealings. Such other business dealings could include, for example, telephone card fraud. Or in another variation in accordance with standardized protocols, weighted variables (or other statistical data, which are part of a uniformly standardized algorithm could be passed between various vendors in order to achieve similar conclusions about individual I without passing literal data record entries between these vendors.

Of course, the presently cited application domain is provided simply for purposes of simplification as there exists a plethora of different application domains and associated system design detail variations thereof. For example, co-pending U.S. patent application Ser. No. 11/691,263, entitled "Database for Pre-Screening Potential Litigious Patients", would be applicable, (for example), to populating and updating health care providers' databases of present and prospective patients with relevant data which is useful for predicting ultimate litigious propensities as well as propensities to commit insurance fraud against insurers, law suits against product or consumer goods manufacturers and law suits against pharmaceutical companies (either in product testing state and/or being marketed within the context of general commercial distribution channels).

F. Example Application

Event-Based Information Disclosure Scenario

In one variation, explicit access to cross database data pertaining to individual I which had presently or previously been exchanged between two or more third party vendors may not be accessible to the receiving third party vendor unless a particular event condition occurs. This event could be indicative of an extraordinary situation such as a presently occurring act of fraud, wherein the function, e.g., rule-based function, which was triggered is based upon data which previously consists of data inputted (exchanged) from a separate third party vendor with which individual I also interacts.

For example, individual I has just made a credit card transaction ten minutes ago for a phone call from Los Angeles to Tampa, Fla., to which he never calls, and his previous credit card records indicate that he had purchased a round trip plane ticket to New York which was scheduled to leave yesterday. Thus, the telephone record database and the airline transaction database, through secure exchange of temporally specific data in which identity information is determined or confirmed through a credit card data base is thus used within the case of the present example to flag a suspicious telephone call in the telephone database which was previously not releasable to any of the three third party entities until the occurrence of fraud had become a highly probable event. In an even more secure variation to that outlined above in which the aggregation of data from the various third party entities occurs also or instead within a central (and highly secure and trusted) database operated by a disinterested third party the above analysis and flagging operations pertaining to the multi-party exchanged data may instead occur external to the individual third party databases.

In the former variation, in one embodiment, it may be advantageous at a number of levels to use a rule-based scheme to enable only the selectively relevant portions of the data records of one database to be shared with another database so as to improve the relevancy of that data which is exchanged. This technique may also be extended within the context of correlating data points across various organizations, users U, and/or individuals I. Moreover, a central database implementation of the same or similar format or service Provider users U may be utilized for purposes of initializing the rules used for determining the relevant data exchange fields and conditions as well as providing additional input for the overall data model. In this way, the second (centralized) system variation may work to the synergistic benefit of the first (distributed) system variation. It is also worthy to note that within the field of network security for distributed applications there exist techniques by which secure (data inaccessible, untamperable and reliable) distributed agent-based functions may reside across multiple, independently secure databases (which in this case correspond to multiple independently secure organizations' intranets) and where these distributed cross-database agents may be programmed to perform a very flexible array of functions based upon both local and distributed persistent monitoring and observation of data, processes, communications or other types of events or patterns.

The underlying distributed agent architecture supporting a generic relatively functionally transparent platform is supported by various conforming systems such as JAM. The JAM project is a data-mining based approach to detecting intruders in computer systems. The project approaches the intrusion detection problem from a data-mining perspective. Large quantities of data are collected from the system and analyzed to build models of normal behavior and intrusion behavior. These models are evaluated on data collected in real time to detect intruders.

This methodology for this platform is also supported within co-pending patent application entitled, SDI-SCAM (U.S. patent application Ser. No. 10/746,825) with references to analyzing data from multiple databases belonging (potentially) to multiple disparate organizations incorporate the use of various multi-database/multi-data source analysis techniques. The method's use of observed data (such as discrete or probabilistic variables) are, of course, extremely varied and may include (but are not limited to) those which are localized, distributed, independent, combinatorial, discrete, parameterized, descriptive, probabilistic, etc.

In one typical example which is of general relevance to the type of database application above presented and herein envisioned such functions may be rule based, rely upon a Bayesian classifier (or other probabilistic type of data model), be able to persistently and dynamically identify unusual or aberrant patterns based upon combinatorial analysis of various types of parameterized variables and where these and other (e.g., descriptive) data analytic functions may be presented to human users utilizing these data mining techniques. These humans may, in turn, construct adaptive rules which seek to identify and learn patterns which are indicative of particular condition-based situations and events which are of particular interest. A certain subset of rules may be expert rules which are inflexible and thus rely solely on conditions of a discrete nature for which humans desire automatic detection and may be refined or adapted subsequently based upon data analysis.

Alternative variations to that of the distributed decentralized multi database analysis variation are also of relevance within the scope of the network architectures of the presently disclosed system and method.

In a somewhat more secure variation these various databases could be replicated (or principally reside) on a physically centralized secure network wherein the agent architecture function and analysis activities are otherwise identical to that of the decentralized distributed variation. In this variation, while the physical infrastructure of the system hardware and servers are centralized, it could be the case that the operational control and security is inherently distributed and thus operated physically remotely by the organization itself (e.g., via a VPN) while the servers are physically situated at the hosting facility which operates the distributed agent functionality. Alternatively, the host itself could, of course, in addition (or instead) perform a myriad of other outsourcing functions which are software based or service based and in this way assume the functional role as an ASP for the organization at various levels of involvement (or for certain special cases as a complete outsourced provider of data-base operations).

In a variation of the distributed embodiment, in which the database is replicated within the centralized secure data storage and analysis facility, it would typically be advantageous (though not exclusively so) for only certain portions of the database and/or of each relevant data record to be replicated at the centralized (agent-enabled) database. This would be advantageous both in terms of storage economics, data communication/updating and certainly and importantly in terms of minimizing risks and liabilities associated with the transfer and handling of PDO's private data. In one variation of this embodiment, it would certainly be advantageous to be able to perform selective updates (as opposed to random, non-coordinated and/or based upon non-distributed agent intelligence) to the replicated centralized database in response to specific event conditions which occur and are detected by a locally running agent based function situated upon the primary (decentralized) version of the database (the detection thresholds for which could be programmed to react in response to even relatively minor deviations from "normal state"). In this regard, the advantages of maintaining a complete continually/dynamically updated version of the database (including all portions of each relevant data record) could be achieved without the need for physically storing and updating those portions of the database which are not of relevance (particularly present/temporal relevance) to the particular objectives of the analytical and flagging functionalities of the associated agents. In order to enable the effective and accurate detection functions of these agents locally residing at the organization's primary (decentralized) databases in dictating the selection and timing of data transfer (which we herein term "data synchronization") from the local organization's primary database to the centralized secondary database it is useful to insure persistent updating (synchronization) of the local primary database agent with that of its counterpart residing at the centralized secondary (ASP hosted) database. This will also help insure against the possibility of certain relevant data which exists within the primary data base not becoming identifiable as such by the agents (and thus not being transferred to the centralized database) due to previous failures to do so (and thus to be able to identify the relevant correlations to the conditions/events which are of interest).

G. Example Application

Centralized Trusted Third Party Data Entity/Purveyor

Another example application of the above-suggested architectural variations may include a homeland security data analysis system in which databases belonging to multiple; perhaps widely disparate third party vendors may be analyzed often in a highly dynamic fashion for purposes of identifying and predicting probabilities of a homeland security threat.

In this application, the initially indicated architecture (for decentralized secure data analysis across various databases) may be performed, however, an additional third party (e.g., the government) would still necessarily be always obligated to obtain access to the relevant data whenever a particular suspicion threshold rose above a certain level as detected, for example, from complete data based on literal or pseudonymized records and/or statistical aggregates of individuals I from among the various relevant disparate databases. As such, it would be the preferred variation to collect data inputs from these various disparate databases in real time in order to perform the statistical aggregation and analysis and statistical threshold-based detection functions whether in a secure or insecure fashion from a central aggregation database.

Because this data is sensitive both from the standpoint of individual data privacy regarding all other non-governmental third party entities, and from the standpoint of guaranteeing its authenticity, completeness and untamperability from the standpoint of national security interest, it would be most ideal for technical means to be introduced which are able to achieve these desired objectives (which are presently or presently forthcoming within the present state of the art for database/database retrieval security/cryptography. The communications pathway between the various disparate third party databases and the central aggregation database may further be designed so as to pass through a pseudonymous proxy server associated with an anonymizing mix path so as to guarantee the untraceability of the originating data source and the individual I's true identity to whom each separate data entry pertains. Such anonymizing mix path could ideally be implemented as well between the servers (including databases pertaining to individuals I associated with organizations and network vendors) in order to further help assure security and inaccessibility of the central aggregation database as well as the organizational and network vendor servers and thus the associated privacy interests of the individuals I who may be monitored and tracked across multiple databases and networks in general or in response to particular suspicions.

In this particular high security architecture, it would be most optimal and important for the sake of maximizing security of the aggregation database containing this extremely sensitive data and the authorized third party accessor (and/or other server for which authorized access is granted) for any authorized third party Accessor who gains access to the central aggregation database who happens to be physically remote from the aggregation database at the time of access (such as over a secure connection) to also utilize a pseudonym proxy server, which could, for example, for highest security as in the present case, perform one time pseudonymous communications, i.e., anonymization for both destination and source, i.e., (the database and its associated address) for each communication or even portion of a communication such as would be usually associated with the anonymyzing mix path routing protocol (wherein the mix path routers are also trusted servers) and each one time communication could thus also be routed through a different anonymizing mix path. Fragmentation of the contests (for each constituent communication) could further be an additional advantage in this scenario.

Resolution credentials (which are indicative of lack of a negative credential) as well as negative credentials themselves would in one variation be an efficient and untamperable means for augmenting the security and authenticity of important facts (or higher-level parameterized and/or abstracted conclusions or features) of interest regarding each individual while managing large multi-vendor/multi-network dossiers of a huge plethora of individuals I. In this regard, the employment of retrieval and analytical agent-enabled trusted servers could further mediate the otherwise potentially privacy intrusive process (if performed instead by a human counterpart of monitoring, detecting, querying and/or extracting data (as would be subject to ACRS) from the database and thereby achieve in theory a relatively high degree of confidence in accurately and comprehensively querying and analyzing the relevant data and formulating the (important) relevant conclusions. In this way, it may be possible to practically implement within the various distributed or centralized database variations distributed agent mediated data analysis and/or agent mediated information transfer/synchronization (which could typically implement techniques for distributed adaptive learning, adaptive and/or expert rules, predictive and/or descriptive data mining as well as other related functions such as all necessary/desired notification/flagging activities) by which such schemes could be implemented across potentially a plethora of third party databases and networks and involving large numbers of individuals I.

H. Example Applications

Medical-Legal System

Figure 8:
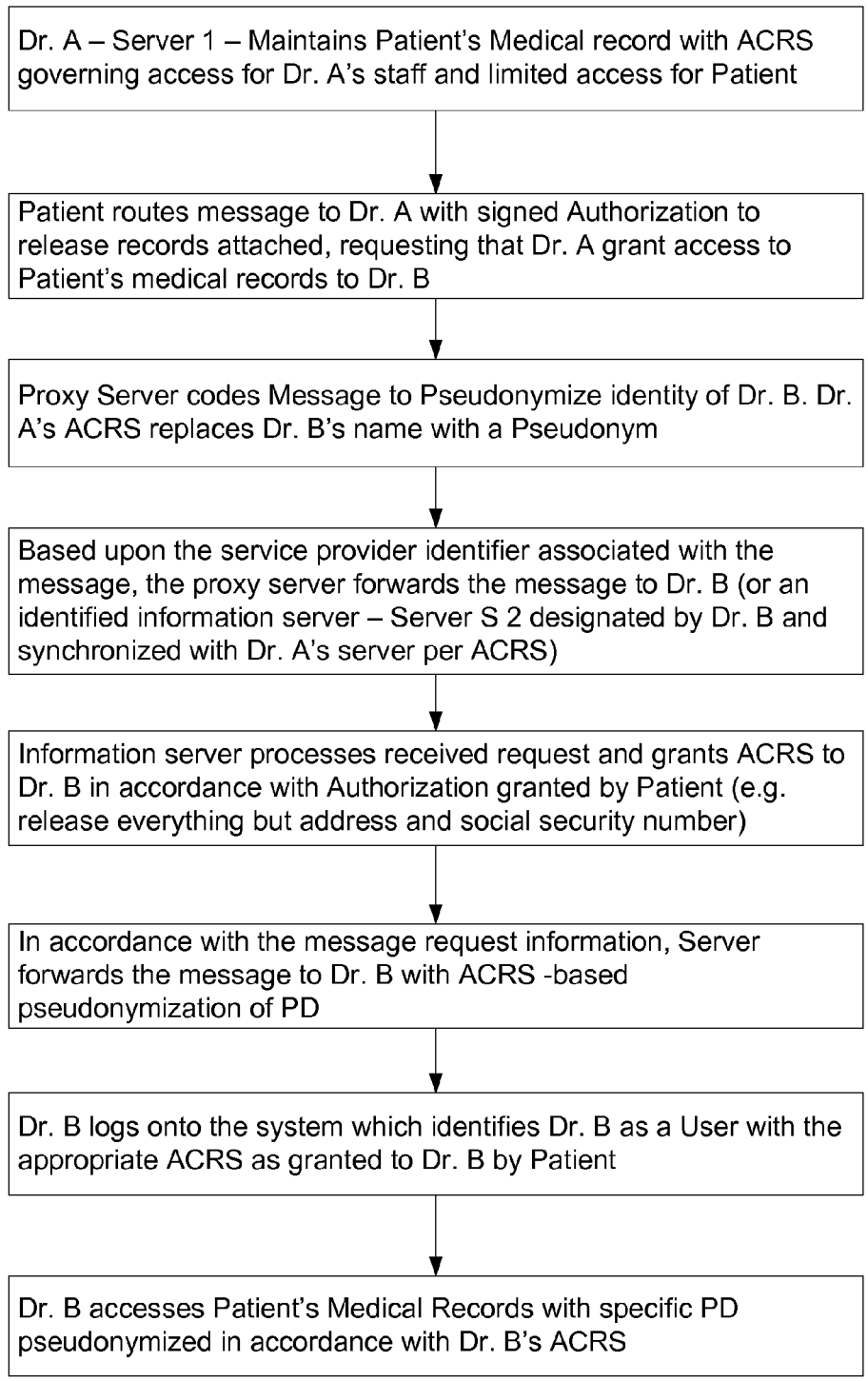
FIG. 8 depicts a Medical-Legal application in which Patient authorizes Dr. A to release partially pseudonymized medical records to Dr. B.

Our system and method allows for the Individual Patient to transact business with multiple Healthcare providers in a system in which the Patient/Consumer and Providers are both Users and Individuals who are both accessing data and having data about them accessed. FIG. 8 is an illustration of how the Method enables Patient to have Dr. A provide Patient's records to Dr. B, while restricting Dr. B's access to PD, such as Patient's address and social security number. In order to protect Patient's PD, each service Provider might transact with the individual Patient under a different pseudonym for the individual. More generally, a coalition of service Providers, all of whom match individuals with the same genre of target objects, might agree to transact with the individual assigned a common pseudonym, so that the target profile interest summary associated with that pseudonym would be complete with respect to said genre of target objects. When an individual is assigned several pseudonyms for different transactions with different coalitions of service Providers, the individual may be assigned a proxy server to service each pseudonym; these proxy servers may be the same or different. A simple example, as set forth in FIG. 8, depicts a scenario in which Patient, a Patient of Dr. A wants to go to Dr. B for a second opinion, but wants the exchange of data between Dr. A and Dr. B to be pseudonymous. Dr. A is a User-U on Server 1. Dr A maintains Patient's medical record with ACRS governing access for Dr. A's staff and limited access for Patient. Patient wants Dr. A to transmit Patient's medical records to Dr. B so that Dr. B can render a second opinion.

Patient routes message to Dr. A with signed Authorization to release records attached, requesting that Dr. A grant access to Patient's medical records to Dr. B. Based upon the service provider identifiers associated with the message and Dr. A and Dr. B, the proxy server forwards the message to Dr. B on either Dr. A's Server 1 or on an identified information server—Server—S 2 designated by Dr. B and synchronized with Dr. A's server 1 based on Dr. B's ACRS.

Information server processes request and grants ACRS to Dr. B in accordance with Authorization granted by Patient (e.g. release everything but my address and social security number). In accordance with the message request information, Server forwards the message to Dr. B with ACRS-based pseudonymization of PD Dr. B logs onto the system which identifies Dr. B as a User with the appropriate ACRS as granted to Dr B by Patient. Dr. B accesses Patient's Medical Records with specific data pseudonymized in accordance with Dr. B's ACRS as granted to Dr B by Patient. At a later time; Patient may choose to further limit or expand Dr. B's access to PD via revised ACRS. In addition, Patient may choose to discharge Dr. B and cancel all Dr. B's rights to access any data concerning Patient.

I. Example Application

Business-to-Consumer Scenarios

Our combined method allows either a single pseudonym for the individual I in all transactions where he or she wishes to remain pseudonymous, or else different pseudonyms for different types of transactions. In the latter case, each service Provider might transact with the individual under a different pseudonym for the individual.

More advantageously, a coalition of service Providers, all of whom match individuals with the same genre of target objects, might agree to transact with the individual assigned a common pseudonym, so that the target profile interest summary associated with that pseudonym would be complete with respect to said genre of target objects. When an individual is assigned several pseudonyms for different transactions with different coalitions of service Providers, the individual may be assigned a proxy server to service each pseudonym. These proxy servers may be the same or different.

J. Detailed Protocol

In a typical implementation of our system, the Accessor/organization (and the Accessor/Organization's Users-U) search for the individual I through the servers S1-S2 and the information servers on the network N. However, rather than directly corresponding with the server record containing the data entries of individual I, the Organization's Users U interact with a proxy server, e.g. S2, as an intermediary between the local server of the Organization's own client and the information server containing the personal data record of individual I.

The proxy server itself can alternatively possess the functionality of the information server itself within this present architectural framework. Mix paths, as described by D. Chaum (Chaum, 1981), allow for untraceability and security between the client, such as C3, and the proxy server, e.g. S2. Let S (MK) represent the digital signing of message M by modular exponentiation with key K as detailed in a paper by Rivest, R. L., Shamir, A., and Adleman, L. (1978). Once an individual is assigned a pseudonym, the request goes to server Z for a pseudonym P and is granted a signed pseudonym that is signed with the private key $SK_z$ of server Z. The following protocol takes place to establish an entry for the individual I in the proxy server S2's database D.

1. The individual's pseudonym is sent to proxy server S2, while the pseudonym has been signed by Z to indicate the authenticity and uniqueness of the pseudonym. The user/Accessor organization such as a law firm or an insurance company not owning the data gets a $PK_p$, $SK_p$ key pair for use with the granted pseudonym, where $SK_p$ is the private key associated with the pseudonym and $PK_p$ is the public key associated with the pseudonym. The user/Accessor organization forms a request to establish contact with the pseudonym P on proxy server S2, by sending the keys $SK_p$ and the $PK_p$ to the proxy server S2. The enveloped message is transmitted to the proxy server S2 through an anonymizing mix path, along with an anonymous return envelope header.

2. The proxy server S2 receives the database creation entry request and associated certified pseudonym message. The proxy server S2 checks to ensure that the requested pseudonym P is signed by server Z and, if so, grants the request and stores the user/Accessor organization's public key $PK_p$ to ensure that only the user/Accessor organization U can make requests with the said keys in the future for the pseudonym P.

3. The structure of the individual's database entry consists of an identity as detailed herein, a target profile interest summary as detailed herein, and a Boolean combination of access control criteria as detailed below, along with the associated public key for the pseudonym P.

4. At any time after database entry for Pseudonym P is established, the user U or individual I may provide proxy server S2 with credentials on that pseudonym, provided by third parties, which credentials make certain assertions about that pseudonym. The proxy server may verify those credentials and make appropriate modifications to the individual's records as required by those credentials, such as recording the individual's new demographic status as (for example) an adult. It may also store those credentials, so that it can present them to other users or service Providers on the individual's behalf.

The above steps may be repeated, with either the same or a different proxy server, each time the individual I needs to be assigned a new pseudonym to handle a different class of personal data for use with a new and disjoint coalition of organization users. In practice, there is an extremely small probability that a given pseudonym may have already been allocated due to the random nature of the pseudonym generation process carried out by Z. If this highly unlikely event occurs, then the proxy server S2 may reply to the data manager with a signed message indicating that the generated pseudonym has already been allocated and asking for a new pseudonym to be generated.

K. Pseudonymous Control of an Information Server or Data Server Containing Private data of Individuals Once a proxy server S2 has authenticated and registered an individual's pseudonym, an organizational Accessor and its Users may begin to check the records of the individual through the services of the proxy server S2, in interacting with other network entities such as service Providers, as exemplified by server S4 in an information service Provider node connected to the network. The organizational Accessor and its Users controls the proxy server S2 by forming digitally encoded requests that the user subsequently transmits to the proxy server S2 over the network N. The nature and format of these requests will vary, since the proxy server may be used for any of the services described in this application, such as the browsing, querying, performing data analytical functions and other navigational functions described below.

In a generic scenario, an organizational Accessor and its Users wish to check the records of an individual under pseudonym P with a particular information provider at address A, where P is a pseudonym allocated to the individual and A is either a public network address at a server such as S4, or another pseudonym that is registered on a proxy server such as S4. In a common version of this scenario, address A is the address of an information provider, and the user is requesting that the information provider send records of interest. The user must form a request R to proxy server S2, that requests proxy server S2 to send a message to address A and to forward the response back to the user.

In other scenarios, the request R to proxy server S2 formed by the user may have different content. For example, request R may instruct proxy server S2 to use the methods described later in this description to retrieve from the most convenient server a particular piece of information that has been multicast to other servers, and to send this information to the user. Conversely, request R may instruct proxy server S2 to multicast to other servers a file associated with a new case history about an individual I by the user, as described below. The situation may also be such that the user is employing the active navigation service described below. This service may more generally include a variety of types of data retrieval modalities including (but not limited to) browsing, querying, analysis, notification, filtering and passive content delivery (push). Request R may instruct proxy server S2, for example, to select a particular cluster from the hierarchical cluster tree and provide a menu of its sub-clusters to the user, or to activate a query that temporarily affects proxy server S2's record of the individual's Private Data.

Regardless of the content of request R, the user, at client C3, initiates a connection to the user's local server S1, and instructs server S1 to send the request R along a secure mix path to the proxy server S2, initiating the following sequence of actions:

1. The user's client processor C3 forms a signed message S(R, $SK_p$), which is paired with an individual's pseudonym P and (if the request R requires a response) a secure one-time set of return envelopes, to form a message M. It protects the message M with a multiply—enveloped route for the outgoing path. The enveloped routes provide for secure communication between S1 and the proxy server S2. The message M is enveloped in the most deeply nested message and is therefore difficult to recover should the message be intercepted by an eavesdropper.

2. The message M is sent by client C3 to its local server S1, and is then routed by the data communication network N from server S1 through a set of mixes as dictated by the outgoing envelope set and arrives at the selected proxy server S2.

3. The proxy server S2 separates the received message M into the request message R, the pseudonym P, and (if included) the set of envelopes for the return path. The proxy server S2 uses pseudonym P to retrieve the corresponding record in proxy server S2's database, which record is stored in local storage at the proxy server S2 or on other distributed storage media accessible to proxy server S2 via the network N. This record contains a public key $PK_p$, user-specific Information, and credentials (if relevant) associated with pseudonym P. The proxy server S2 uses the public key $PK_p$ to check that the signed version $S(R, SK_p)$ of request message R is valid.

4. Provided that the signature on request message R is valid, the proxy server S2 acts on the request R. For example, in the generic scenario described above, request message R includes an embedded message M1 and an address A to whom message M1 should be sent. In this case, proxy server S2 sends message M1 to the server named in address A, such as server S4. The communication is done using signed and optionally encrypted messages over the normal point to point connections provided by the data communication network N. When necessary, in order to act on embedded message M1, server S4 may exchange or be caused to exchange further signed and optionally encrypted messages with proxy server S2, still over normal point to point connections, in order to negotiate the release of individual-specific information and credentials from proxy server S2. In particular, server S4 may require server S2 to supply credentials proving that the user is entitled to the information requested—for example, proving that the user is a subscriber in good standing to a particular information service.

5. If proxy server S2 has sent a message to a server S4 and server S4 has created a response M2 to message M1 to be sent to the user, then server S4 transmits the response M2 to the proxy server S2 using normal network point-to-point connections.

6. The proxy server S2, upon receipt of the response M2, creates a return message Mr comprising the response M2 embedded in the return envelope set that was earlier transmitted to proxy server S2 by the user in the original message M. It transmits the return message Mr along the pseudonymous mix path specified by this return envelope set, so that the response M2 reaches the user at the user's client processor C3.

7. The response M2 may contain a request for a certain case history of an individual under the pseudonym P, to the information server S4. The user may then respond by means of a message M3 transmitted by the same means as described for message M1 above, which message M3 encloses some form of anonymous history.

8. Either the response message M2 from the information server S4 to the user, or a subsequent message sent by the proxy server S2 to the user, may contain the case history that is related to the user's request about an individual of interest to the user. Typically, if the user has just retrieved a target object X about the individual then (a) either proxy server S2 or information server S4 determines a weighted set of parameters "associated with" target object X, (b) a subset of this set is chosen randomly, where the weight of a parameter is proportional to the probability that it is included in the subset, and (c) proxy server S2 selects from this subset just those parameters related to the case history that the user is most likely to be interested in. In the variation where proxy server S2 determines the set of parameters associated with target object X, then this set typically consists of all parameters that the proxy server's owner has been paid to disseminate and the parameters are within a threshold similarity distance of the target profile of target object X. In the variation where proxy server S4 determines the set of parameters associated with target object X, users typically purchase the parameters in this set. In either case, the weight of a parameter is determined by the amount that a user is willing to pay for it. Following step (c), proxy server S2 retrieves the selected parameters and transmits it to the user's client processor C3, where it will be displayed to the user, within a specified length of time after it is received, by a trusted process running on the user's client processor C3. When proxy server S2 transmits a parameter, it sends a message to the data manager of the individual's database, indicating that the parameter has been transmitted to a user with a particular predicted level of interest. The message may also indicate the identity of target object X. In return, the data manager may transmit an electronic payment to proxy server S2 as a service fee. The proxy server optionally forwards a service fee to the information server.

L. Access and Reach-ability

Control of Individuals and Individual-Specific Information

Although the Individual's true identity is protected by the use of secure mix paths, pseudonymity does not guarantee complete privacy. In particular, service Providers, such as law firms or insurance companies or their advertising agents, can, in principle, employ individual-specific data to barrage individuals with unwanted solicitations. The general solution to this problem is for proxy server S2 to act as a representative on behalf of each individual in its individual base, permitting access to the individual and the individual's Private Data only in accordance with criteria that have been set by the individual. Proxy server S2 can restrict access in two ways:

1. The proxy server S2 may restrict access by third parties to server S2's pseudonymous database of individual-specific information. When a third party such as an insurance company advertiser sends a message to server S2 requesting the release of individual-specific information for a pseudonym P, server S2 refuses to honor the request unless the message includes credentials for the Accessor adequate to prove that the Accessor is entitled to this information. The individual associated with pseudonym P may at any time send signed control messages to proxy server S2, specifying the credentials or Boolean combinations of credentials that proxy server S2 should thenceforth consider to be adequate grounds for releasing a specified subset of the information associated with pseudonym P. Proxy server S2 stores these access criteria with its database record for pseudonym P. For example, an individual might make a request to proxy server S2 to release his/her personal information, legal history or insurance purchase information only to selected information providers, to selected insurance companies or selected law firms and to market researchers who have paid individual I for the right to study individual's data.

2. The proxy server S2 may restrict the ability of third parties to send electronic messages to the individual. When a third party (such as an insurance company or law firm advertiser) attempts to send information (such as a textual message or a request to enter into spoken or written real-time communication) to pseudonym P, by sending a message to proxy server S2 requesting proxy server S2 to forward the information to the individual at pseudonym P, proxy server S2 will refuse to honor the request, unless the message includes credentials for the Accessor adequate to meet the requirements the individual has chosen to impose, as above, on third parties who wish to send information to the individual.

If the message does include adequate credentials, then proxy server S2 removes a single-use pseudonymous return address envelope from its database record for pseudonym P, and uses the envelope to send a message containing the specified information along a secure mix path to the individual with the pseudonym. If the envelope being used is the only envelope stored for pseudonym P, or, more generally, if the supply of such envelopes is low, proxy server S2 adds a notation to this message before sending it, which indicates to the individual's local server that it should send additional envelopes to proxy server S2 for future use.

In a more general variation, the individual may instruct the proxy server S2 to impose more complex requirements on the granting of requests by third parties, not simply Boolean combinations of required credentials. The individual may impose any Boolean combination of simple requirements that may include, but are not limited to, the following:

(a) the Accessor (third party) is a particular party;

(b) the Accessor has provided a particular credential;

(c) satisfying the request would involve disclosure to the Accessor of a certain fact about the individual's Private Data;

(d) satisfying the request would involve disclosure to the Accessor of the individual's personal history;

(e) satisfying the request would involve disclosure to the Accessor of statistical summary data, which data are computed from the individual's Private Data or personal history together with Private Data and the personal histories of at least n other individuals in the individual base of the proxy server;

(f) the content of the request is to send the user, e.g. a prescription insurance company or its authorized agent, a target object, and this target object has been digitally signed with a particular private key (such as the private key used by the National Pharmaceutical Association to certify approved documents);

(g) the content of the request is to send the user a target object about the individual's history, digitally signed by a profile authentication agency, guaranteeing that the target object is a true and accurate profile of an individual it claims to describe, with all attributes authenticated;

(h) the Accessor indicates its willingness to make a particular payment (or form of economic consideration or other compromise) to the data manager and/or the proxy server manager in exchange for the fulfillment of the request.

The steps required to create and maintain the individual's database access-control rule set for a single database are as follows:

1. The individuals' database manager composes a Boolean combination of predicates that, apply to requests. The resulting complex predicate should be true when applied to a request that the individual's database manager wants proxy server S2 to honor, and false if otherwise. The complex predicate may be encoded in another form, for efficiency.

2. The complex predicate is signed with $SK_p$, and transmitted from the user's client processor C3 to the proxy server S2 through the mix path enclosed in a packet that also contains the individual's pseudonym P.

3. The proxy server S2 receives the packet, verifies its authenticity using $PK_p$ and stores the access control instructions specified in the packet as part of its database record for pseudonym P.

The proxy server S2 enforces access control as follows:

1. The third, party (Accessor) transmits a request to proxy server S2 using the normal point-to-point connections provided by the network N. The request may be to access the Individual's Private Data (or particular subset thereof) and the personal histories associated with a set of pseudonyms P1 . . . . Pn; or to access the individuals' profiles associated with a set of pseudonyms P1 . . . Pn; or to forward a message to the individuals associated with pseudonyms P1 . . . . Pn. The Accessor may explicitly specify the pseudonyms P1 . . . Pn, or may ask that P1 . . . . Pn be chosen to be the set of all pseudonyms registered with proxy server S2 that meet specified conditions.

2. The proxy server S2 indexes the database record for each pseudonym Pi ($1<=i<=n$), retrieves the access requirements provided for the individual associated with Pi, and determines whether and how the transmitted request should be satisfied for Pi. If the requirements are satisfied, S2 proceeds with steps 3a-3c.

3a. If the request can be satisfied but only upon payment of a fee, the proxy server S2 transmits a payment request to the Accessor, and waits for the Accessor to send the payment to the proxy server S2. Proxy server S2 retains a service fee and forwards the balance of the payment to the Individual's database manager.

3b. If the request can be satisfied but only upon provision of a credential, the proxy server S2 transmits a credential request to the Accessor, and waits for the Accessor to send the credential to the proxy server S2.

3c. If the nature of the request constitutes (at least in part) a request to engage in a communication with the individual (e.g., in addition or instead of gaining access to individual-specific information), the proxy server S2 satisfies the request by disclosing individual-specific information to the Accessor, e.g. a law firm representative or an insurance company agent, by providing the Accessor with a set of single-use envelopes to communicate directly with the individual, or by forwarding a message to the individual.

4. Proxy server S2 optionally sends a message to the Accessor, indicating why each of the denied requests for P1 . . . Pn was denied, and/or indicating how many requests were satisfied.

5. The active and/or passive relevance feedback provided by any Accessor/user with respect to any Private Data or history sent by any path to or from the Accessor is tabulated by the above-described tabulating process. As described above, a summary of such information is periodically transmitted to the proxy server S2 to enable the proxy server S2 to update that individual's history.

The access control criteria can be applied to solicited as well as unsolicited transmissions. That is, the proxy server can be used to protect the Accessor/user from inappropriate or misrepresented Private Data from the individuals' database that the user may request. If the user requests personal data or personal history from an information server, but the data turns out not to meet the access control criteria, then the proxy server will not permit the information server to transmit the target object to the user, or to charge the user for such transmission. For example, to guard against histories whose profiles have been tampered with, the user may specify an access control criterion that requires the Provider to prove the history's accuracy by means of a digital signature from a profile authentication agency. The use of a variety of other data securing techniques and authenticity verification measures could be responsibly applied here as well as to augment the intermediary of a profile authentication agency.

M. Distribution of Information with Multicast Trees

Figure 7:
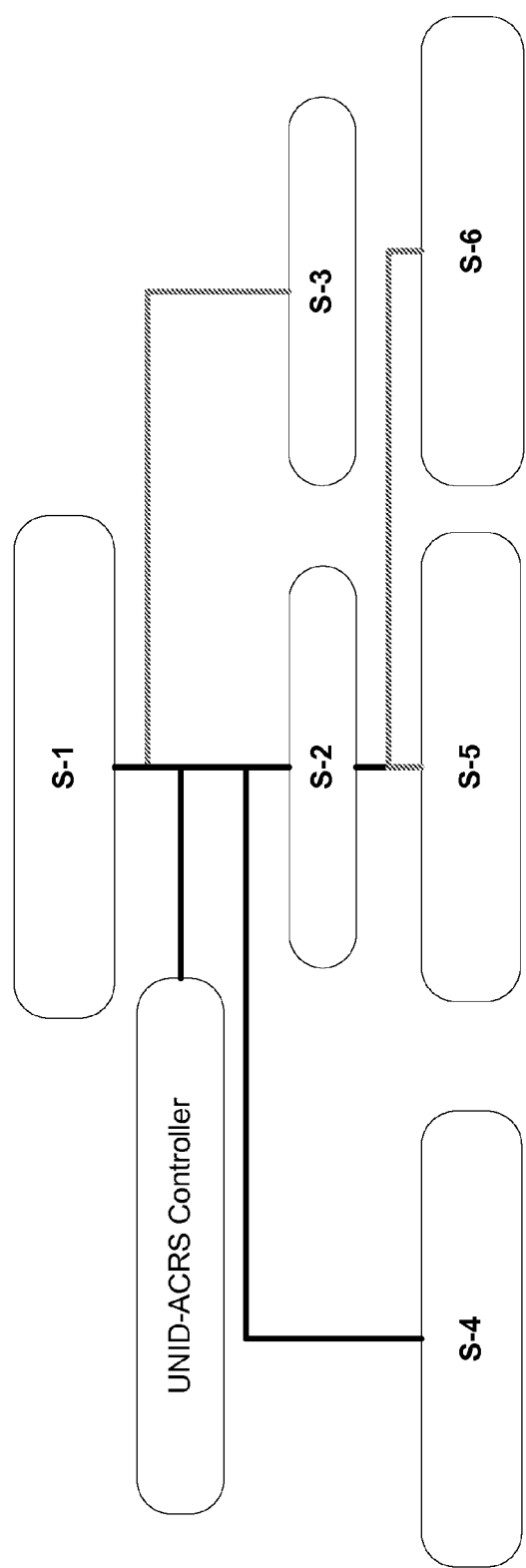
FIG. 7 depicts a UNID-ACRS controller as a form of PPS which is implemented to control UIDs and ACRS among multiple servers in a "network tree" configuration. The UNIT-ACRS Controller maximizes control over the Individual UID assignments and Users' ACRS throughout all Servers in the Network Tree to maximize security, privacy and accountability when the User accesses Private Data (pseudonymous and actual per the ACRS).

The graphical representation of the network N presented in FIG. 7 shows that at least one of the data communications links can be eliminated, while still enabling the network N to transmit messages among all the servers. By elimination, we mean that the link is unused in the logical design of the network, rather than a physical disconnection of the link. The graphs that result when all redundant data communications links are eliminated are termed "trees" or "connected acyclic graphs." A graph, where a message could be transmitted by a server through other servers and then returned to the transmitting server over a different originating data communications link is termed a "cycle." A tree is thus an acyclic graph whose edges (links) connect a set of graph "nodes" (servers). The tree can be used to efficiently broadcast any data file to selected servers in a set of interconnected servers.

The tree structure is attractive in a communications network because much information distribution is multicast in nature—that is, a piece of information available at a single source must be distributed to a multiplicity of points where the information can be accessed. This technique is widely known. For example, "FAX trees" are in common use in political organizations, and multicast trees are widely used in distribution of multimedia data in the Internet (Bolot, Turletti and Wakeman, 1994; Deering Estrin, Farinacci, Jacobson, Liu and Wei, 1994). While there are many possible trees that can be overlaid on a graph representation of a network, both the nature of the networks (e.g., the cost of transmitting data over a link) and their use (for example, certain nodes may exhibit more frequent intercommunication) can make one choice of tree better than another for use as a multicast tree. One of the most difficult problems in practical network design is the construction of "good" multicast trees, that is, tree choices which exhibit low cost (due to data not traversing links unnecessarily) and good performance (due to data frequently being close to where it is needed)

N. Network Tree Architecture with UNID-ACRS Control Database

As stated in the previous section, a tree structure is attractive in a communications network because much information distribution is multicast in nature—that is, a piece of information available at a single source must be distributed to a multiplicity of points where the information can be accessed. Within the Network Tree Architecture, the UNID-ACRS Control Database is the single source for managing assignments of ACRS and UNID's for Persons, and (potentially) Organizations. See FIG. 7.

O. Privacy and Security Considerations in the Design of the Database and Information Retrieval Protocol There are additional database architectural considerations which could be feasibly implemented for purposes of addressing and perhaps potentially achieving several soluble (or partially soluble) system level objectives. These objectives may be important for at least certain embodiments and various scenarios of the present system and method as disclosed (as well as being of general high level relevance to the database/information retrieval field of art). Some of these potentially advantageous considerations and objectives include:

1. Database and information retrieval design which attempts to assure the Accessor data integrity and authenticity of the accessed data from the database.

2. Unidentifiability and (ideally) undetectability (as is typical within the case of the present system) of the Accessor's query and intent (information theoretic secure queries after one possible approach for achieving this objective).

3. From the Individual I's and Database purveyor's perspective the protectability/security of the database contents slated to potential access by a query as well as those contents of the database, which exist external to that of the access permissions as provided by the access controls set forth by the purveyor (and/or individuals I). Relatedly, the security (including absolute constraints and limitations) as to the objectives and capabilities of potential scope of actions, may be performed by the query in connection with accessing the database.

4. Maintaining the desired security/privacy objectives and network resource economic conservation benefits achieved by traditional non-persistent querying procedures, however, within the context of implementing instead persistent query functions upon the target database(s).

Following is a list of specific classes of technical objectives which are achievable by present state of the art secure information storage and retrieval methods, followed by relevant supporting public domain publications substantiating these methods. A subsequent summary list of heretofore novel ideas which further supplement and provide extensions to the desirable design characteristics which this section suggests is further provided. It is worthy to note that while these methods may be in part distinct and independent of one another, it is intended for the sake of elucidating the further novelty which we herein propose in this section that depending upon the particular security and privacy related objectives as disclosed within the present system and method (as well as analogously for potentially any other security enhanced information retrieval system context) that certain combinations (or potentially the combination of all of the following systems and methods supporting each class of functional objectives) be integrated together in combinatorial fashion.

Security of Data Relative to the Query
(1) Yael Gertner, Yuval Ishai, Eyal Kushilevitz, and Tal Malkin. Protecting Data Privacy in Private Information Retrieval Schemes. Journal of Computer and System Sciences (JCSS) vol. 60(3) pp. 592-629. An extended abstract has appeared in Proc. of the 30th ACM Symp. on the Theory of Computing (STOC '98).

Reducing the Number of Auxiliary Servers
(1) E. Kushilevitz, and R. Ostrovsky, "Replication Is Not Needed: Single Database, Computationally-Private Information Retrieval", FOCS 97.

Security of the Query of the User
(1) B. Chor, O. Goldreich, E. Kushilevitz, and M. Sudan, "Private Information Retrieval", FOCS 95.

Reducing the Communication Between the User and Server
(1) Y. Ishai, and E. Kushilevitz, "Improved Upper Bounds on Information-Theoretic Private Information Retrieval", STOC 99.
(2) E. Kushilevitz, and R. Ostrovsky, "One-way Trapdoor Permutations Are Sufficient for Non-Trivial Single-Server Private Information Retrieval", EuroCrypt 2000.
(3) Amos Beimel and Yuval Ishai. Information-Theoretic Private Information Retrieval: A Unified Construction. Proc. of ICALP '01.

(4) Amos Beimel, Yuval Ishai, Eyal Kushilevitz, and Jean-Francois Raymond. Breaking the $O(n^{\{1/(2k-1)\}})$ Barrier for Information-Theoretic Private Information Retrieval. Proc. of FOCS '02.

Reducing the Computation of the Server
(1) Amos Beimel, Yuval Ishai, and Tal Malkin. Reducing the Servers' Computation in Private Information Retrieval: PIR with Preprocessing. Proc. of the 20th Annual IACR Crypto conference (CRYPTO '00).
(2) Giovanni Di Crescenzo, Yuval Ishai, and Rafail Ostrovsky. Universal Service-Providers for Private Information Retrieval. Journal of Cryptology vol. 14(1), pp. 37-74. An extended abstract has appeared in Proc. of the 17th ACM Symp. on Principles of Distributed Computing (PODC '98).
(3) Yael Gertner, Shafi Goldwasser, Tal Malkin. A Random Server Model for Private Information Retrieval. 2nd International Workshop on Randomization and Approximation Techniques in Computer Science (RANDOM '98).

How to Have Secure Queries Along with a Payment Scheme
(1) William Aiello, Yuval Ishai, and Omer Reingold. Priced Oblivious Transfer How to Sell Digital Goods. Proc. of the 19th Annual IACR
Eurocrypt conference (EUROCRYPT '01).

Security of the Identity of the User
(1) D. .about Chaum. Untraceable Electronic Mail, Return Addresses, and Digital Pseudonyms. CACM vol. 24, no. 2(1981), p. 84-88.
(2) C. .about Rackoff, D. R. ~Simon. Cryptographic Defense Against Traffic Analysis. STOC 1993.

(1) In the schemes above it is assumed that the database provides the correct data since the database is being paid for the information. However in some cases it might be possible that there will be a concern for the integrity of data. This can be addressed via a zero knowledge proof that the database will give to the user. This proof will convince the user of the integrity of the data while revealing nothing about the data itself: Such a scheme could potentially be used to prove either with intermittent or persistent query procedures certain facts or even queriable high level conclusions or relationships relating to the data. Secure validation of the present state of the data such as its unchangeability over time would be another useful application for zero knowledge proof.

(2) Some of the schemes dealt with in the references above rely on auxiliary servers. What this means is that there is a server that is paid to hold some information and perform some computations and interaction. Yet the server cannot obtain information about the data or about the user's query. Instead we can think of a scheme which will rely on a totally trusted server. Such a server will learn information about the user's query and about the database. Yet the trusted server is fully trusted not to divulge the information it learned about one party to the other party. Therefore, the parties involved in the scheme still remain secure. This is a fairly big assumption to make. However, in some-applications this might be appropriate. Therefore in those applications, it is very beneficial to use this scheme because it is very efficient in terms of computation, and communication.

(3) The above schemes deal with one-time queries. Those are queries to a static database about a particular entry in that database. It is also possible that queries to the database will be a question about some function of many entries. The schemes above touch on this issue only briefly. Another extension of the queries mentioned before is a query to a database that continues changing. The query asks about whether a change to a particular entry was made. This is of great use in many applications and significant extends the utility of the ideas in the above references.

(4) In the case of No. 3 above an intermittently presented or persistent querying procedure used to determine whether a change to a particular entry was made could also utilize the idea of a zero knowledge proof which could provide significant advantages both in terms of assuring the database of security with regards to the query/accessor (this may be of particular significance in the case of persistent querying) and in terms of assuring the accessor as to the integrity (including possibly untamperability) of the data which may include, for example, proofs as to certain observable elements and/or features of the constituent data which the accessor could reasonably expect would constitute evidence of integrity or untampered state of the data if such elements and/or features could be proven by the zero knowledge proof to be intact or unchanged. Likewise, such features could provide similar assurances to the database purveyor (particularly in the case of persistent querying procedures) as to the integrity of the data in light of the querying procedure (or in general) and perhaps even provide certain high level guarantees as to the objectives (and thus associated constraints) which constitute the query itself.

In addition it can be appreciated that particularly in the case of multi-(or particularly numerous database) analysis, monitoring, etc., such a useful scheme could be extremely valuable for the objectives of the accessor while concomitantly enabling substantially all of the security, privacy and control advantages achieved with traditional individually operated and secured databases. (This, of course, as the present spec elucidates is of great relevance to currently emerging privacy regulations).

The invention claimed is:
1. A method for exchange of pseudonymous personal information between two or more data storage servers or within a data storage server in which the identities of persons, associated servers and/or associated organizations with which the personal information resides is pseudonymous, comprising:
assigning respective unique identifications (UIDs) to persons having private data for storage;
registering the persons with a pseudonymous proxy server as at least one of a plurality of respective user types based on the respective person's relationship to the stored private data with associated pseudonyms for each user and sets of rules that control access to the respective person's stored private data and pseudonyms for the respective person's stored private data by persons registered with the pseudonymous proxy server based at least on user type;
providing service provider identifiers to each person that identifies the respective persons to a service provider;
the pseudonymous proxy server providing each person's associated pseudonym and each person's service provider identifier with a random factor;
transmitting a message from one of the persons to the service provider through the pseudonymous proxy server, wherein the pseudonymous proxy server receives the message and, based on the set of rules that control said one person's access to the stored private data of a person registered with the pseudonymous proxy server, validates a relationship between said one person and the service provider and transmits the message to the service provider if the relationship between said one person and the service provider is validated; and said pseudonymous proxy server authorizing said one person to view the stored private data of said person or pseudonyms for said private data of said person based on said set of rules that control said one person's access to said stored private data of said person and said pseudonyms for said private data of said person;

wherein the pseudonymous private data for a person registered with the pseudonymous proxy server is the person's medical records and said two or more data storage servers are controlled by respective medical service providers, where said person and said respective medical service providers are permitted access to said person's medical records based on said set of rules, and wherein a transfer of said patient's medical records from one medical service provider to another medical service provider includes the replacing of the another medical service provider's name with a pseudonym, pseudonymizing the person's medical records in accordance with the another medical service provider's access rights, and providing the access rights to the another medical service provider based on authorization to the person's medical records as granted by the person.

2. The method of claim 1, wherein the pseudonymous proxy server controls unique identifications (UIDs) and sets of rules for respective persons among multiple servers in a hub and spoke network configuration.

3. The method of claim 1, wherein the pseudonymous proxy server controls unique identifications (UIDs) and sets of rules for respective persons among multiple servers in a network tree configuration.

4. The method of claim 1, comprising the person encrypting said pseudonym.

5. The method of claim 1, further comprising the pseudonymous proxy server validating a relationship between said one person and the owner of the stored private data and transmitting the message to the service provider if the relationship between said one person and the owner of the stored private data is validated.

* * * * *